United States Patent [19]

Asakura et al.

[11] Patent Number: 4,789,817
[45] Date of Patent: Dec. 6, 1988

[54] CONTROL SYSTEM FOR AN ENGINE-DRIVEN AC GENERATOR

[75] Inventors: Masahiko Asakura; Genzo Hosono, both of Saitama, Japan

[73] Assignee: Honda Giken Kogyo Kabushiki Kaisha, Tokyo, Japan

[21] Appl. No.: 70,614

[22] Filed: Jul. 9, 1987

Related U.S. Application Data

[63] Continuation of Ser. No. 855,142, Apr. 23, 1986, abandoned.

[30] Foreign Application Priority Data

| Apr. 24, 1985 | [JP] | Japan | 60-87689 |
| Apr. 24, 1985 | [JP] | Japan | 60-87690 |
| Apr. 26, 1985 | [JP] | Japan | 60-90382 |
| Apr. 26, 1985 | [JP] | Japan | 60-90383 |

[51] Int. Cl.⁴ .................................... H02P 9/00
[52] U.S. Cl. ........................... 322/28; 322/59; 322/99; 320/64; 361/21; 361/93; 318/139
[58] Field of Search ........... 322/28, 59, 99; 320/64; 361/20, 21, 93; 318/139

[56] References Cited

U.S. PATENT DOCUMENTS

| 3,938,005 | 2/1976 | Cummins | 322/28 X |
| 4,200,832 | 4/1980 | Johansson et al. | 322/59 |
| 4,401,937 | 8/1983 | Morishita | 320/64 X |
| 4,449,080 | 5/1984 | Konrad et al. | 318/139 |
| 4,470,003 | 9/1984 | Mitchell | 322/28 X |
| 4,555,742 | 11/1985 | Gray et al. | 361/93 |

Primary Examiner—Patrick R. Salce
Assistant Examiner—Anita M. Ault
Attorney, Agent, or Firm—Lyon & Lyon

[57] ABSTRACT

The present invention relates to a control system for an engine driven generator, and more specifically, to a control system for controlling the field current to the field coil of the generator to prevent a rapid decrease in the engine rotational speed throughout a transient period when an electric load, such as a head light or an air conditioner, is switched on and begins to draw current.

In one embodiment of the invention, the control system comprises digital control means for repeatedly alternating throughout the transient period between calculating an on period and switching the field current on for the on period, and then calculating an off period and switching the field current off for the off period. The digital control means also detects a high output torque operating condition of the engine, and when such a condition is present, switches the field current on throughout the entire transient period.

In a second embodiment of the invention, the control system comprises analog or "hard-wired" control means for performing the same functions as the digital control means.

55 Claims, 17 Drawing Sheets

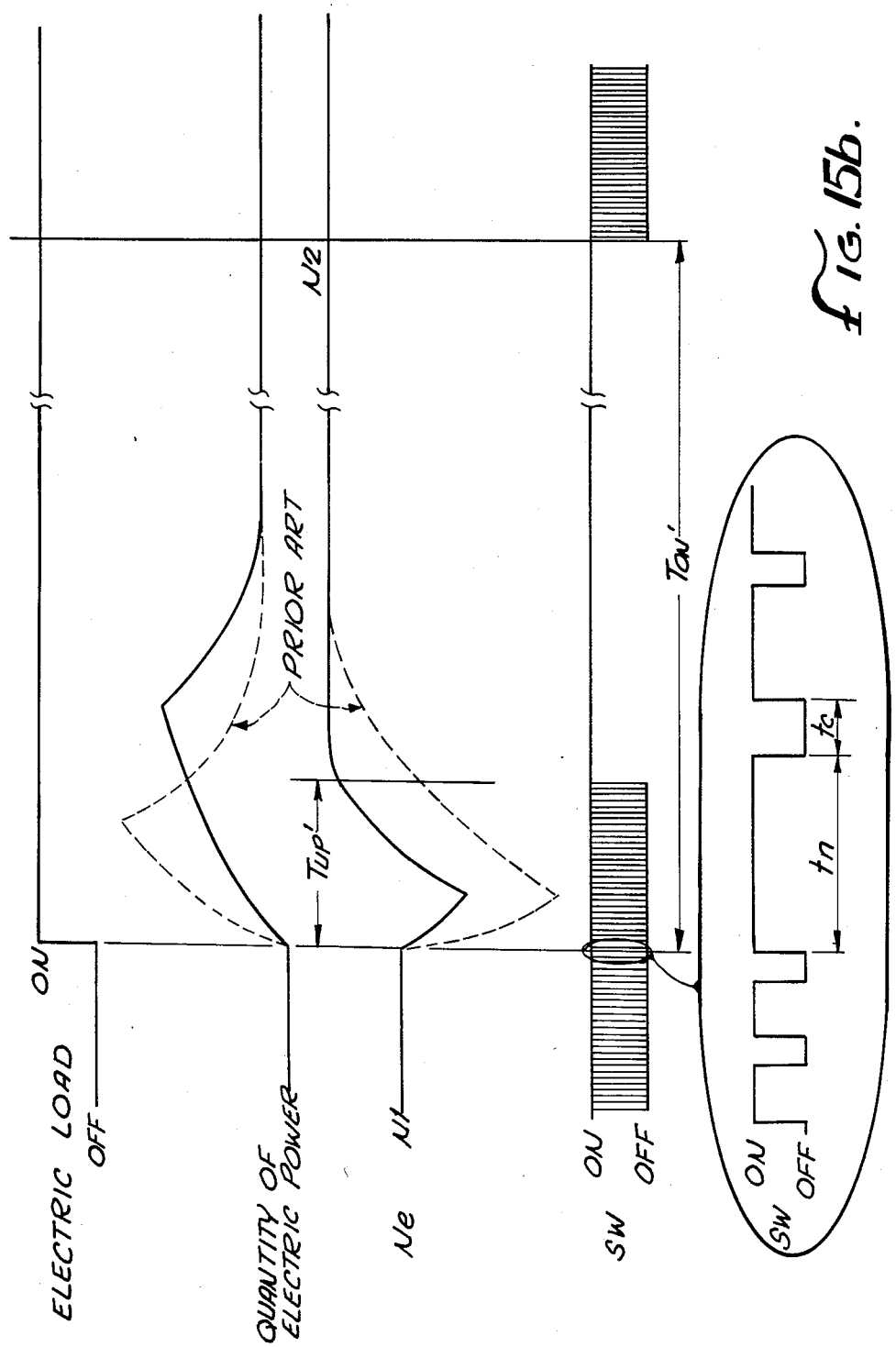

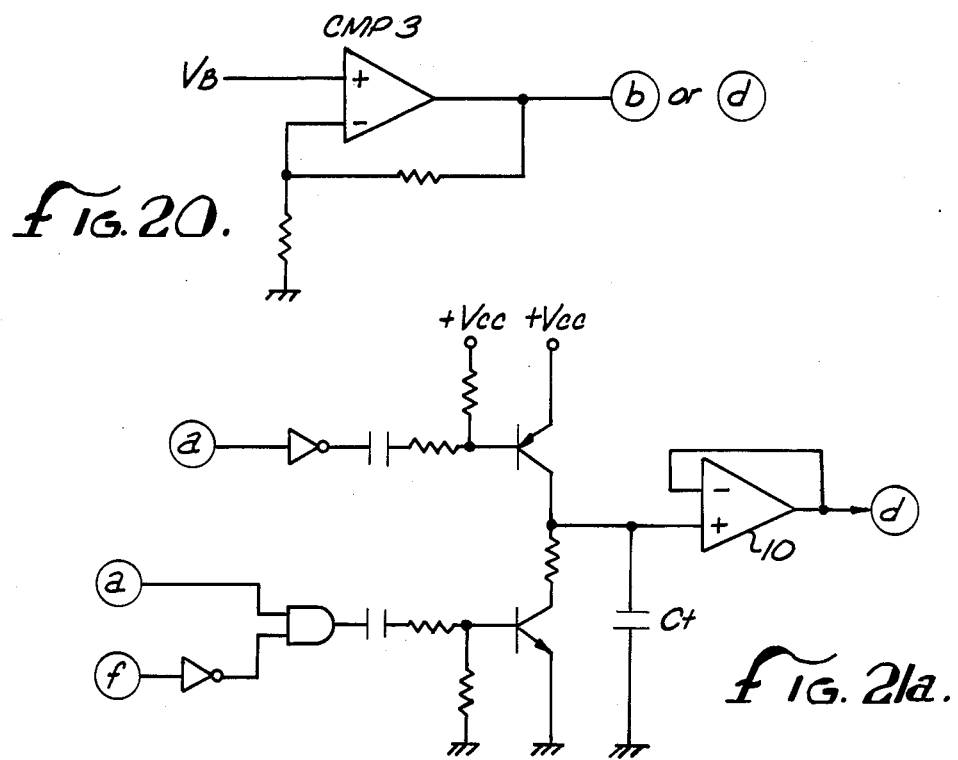
fig.20.
fig.21a.
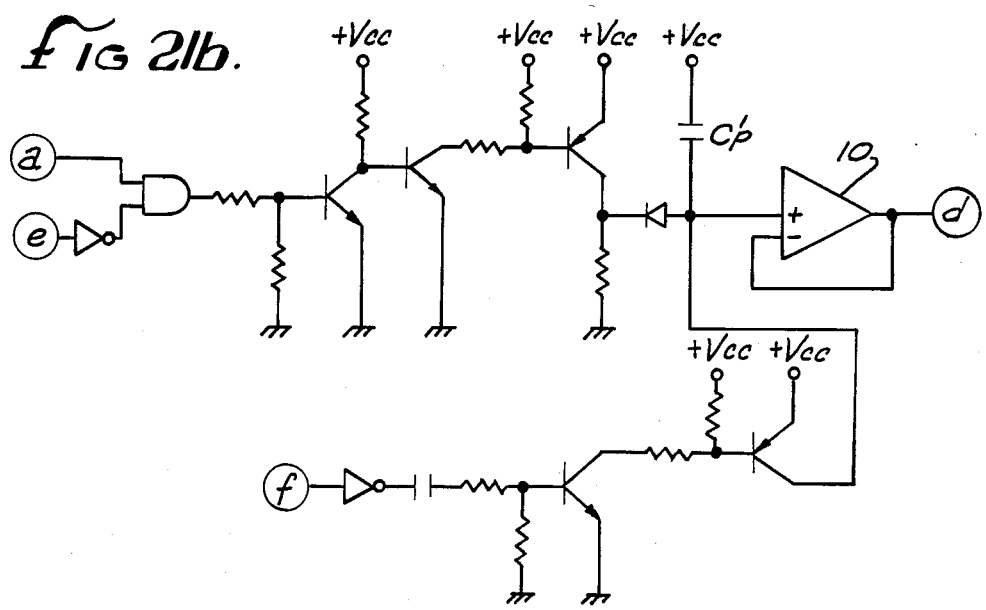
fig.21b.

CONTROL SYSTEM FOR AN ENGINE-DRIVEN AC GENERATOR

This application is a continuation, of application Ser. No. 855,142, filed Apr. 23, 1986, now abandoned.

TECHNICAL FIELD

This invention relates to a control system for an engine driven generator for controlling switching of a generating voltage of the generator.

BACKGROUND

Generally in an automobile a battery 1 and a generator 3 driven by an engine 2 are connected in parallel to an electric load 4, for example as shown in FIG. 1, and a generating voltage of the generator 3 is normally defined to be a predetermined voltage of the battery 1 (14.5 V for example) so that the voltage may be sufficient for charging of the battery 1 and for supplying the electric load 4. The generating power of the generator 3 changes according to a use condition of the lectric load, and the load to the engine which drives the generator 3 changes in proportion thereto. In the case that the electric load 4 is small and the engine 2 is in a condition other than deceleration, the load of the generator 3 to the engine 2 may be reduced by lowering the generating voltage of the generator 3 to a charging voltage of the battery 1 (12.5 V for example), thereby reducing the load of the generator 3 and reducing a driving loss of the engine 2 to thereby improve fuel consumption.

FIG. 2 shows characteristics of an output current of the generator 3 relative to engine rotational speed (RPM), provided that the generating voltage of the generator is defined as a parameter. It is apparent from FIG. 2 that the higher the generating voltage, the greater the generated energy, and consequently the faster the battery is charged. With use of these characteristics, when power is generated by the lower voltage at a light electric load which is in a normal condition, a charging current is reduced to decrease the engine load. On the other hand, at a heavy electric load, the generating voltage is switched to a higher value (e.g. 14.5) to increase the generated energy, thereby sufficiently meeting load requirements and suppressing discharging of the battery.

Conventionally, in a circuit including the battery and the generator driven by the engine which are connected with each other in parallel to the electric load, the battery voltage is detected and compared with a predetermined reference voltage so as to maintain the battery voltage at a constant value according to a charged condition of the battery, a closed condition of the electric load, and an operating condition of the engine. Then, according to the comparative result, a reference generating voltage of a voltage regulator for On-Off control of the field current of the generator is controlled to be switched to a high or low value.

However, in the above-mentioned conventional control of the engine driven generator, when the generator is changed to a reduced generating position of lower generated energy, and the electric load, such a head lamp and/or an air conditioner generating a large rush of current upon application of power source, is applied, and at this time the generator is switched to a large generating position of higher generated energy, the "ON" time of the field current at a higher generating voltage in an initial stage of the switching is increased and the generated energy of the generator is rapidly increased for a period of time until a balanced condition is reached nd this causes a rapid decrease in the engine rotational speed, thereby impairing performance of the engine. Stated differently, if the generator is generating at low power (e.g. at 12.5 V) and a load (e.g. headlights or air conditioner) is switched on, the generator (via control of its field) is caused to generate at a higher power level (e.g. 14.5 V). The generated power sharply increases thereby causing the engine RPM (Ne) to drop.

A further understanding of background systems may be found in Goto U.S. patent application Ser. No. 616,262, filed May 31, 1984 and assigned to the assignee of this application, and U.S. Pat. Nos. 3,491,285, 3,659,188 and 4,300,088.

SUMMARY

Accordingly, it is an object of this invention to provide an improved control system for an engine driven generator.

Another object of this invention is to provide a control system for an engine driven generator wherein even if an electric load with a large rush current is turned on, the generating voltage of the generator is changed and controlled so that a burden is not rapidly applied to the engine.

Thus, in prior systems the AC generator on a vehicle is regulated at two setting voltages (14.5 V and 12.5 V) corresponding to engine driving and electric load conditions. When the setting voltage changes from lower to higher, the generator load suddenly increases and causes a drop of the engine revolutions. The present invention provides control of the voltage regulator so as to prevent a sudden torque (engine revolution) change.

In one embodiment according to the present invention, there is provided a control system for an engine driven generator for controlling the On-Off switching of the field current in the generator connected in parallel to a battery so that a battery voltage may become a predetermined reference voltage under control of a controller according to an output signal from a comparator which compares said battery voltage with said reference voltage, said controller having means for measuring and holding a continuation time of an ON-state of the field current of the generator, means for detecting that a present continuation time of the ON-state is longer than a previous continuation time by a predetermined time, and means for temporarily forcibly switching the field current of the generator to an OFF-state upon detection of the present continuation time. Furthermore the system preferably includes means for detecting that an output torque of the engine is in a high operating condition, and means for releasing the forcible switching of the field current of the generator upon detection of the high output torque of the engine.

In an alternative embodiment the controller includes means for counting and retaining the ON period of the field coil, means for detecting that the ON period of the present time is longer than that of the last time by a predetermined length of time, and means for forcibly switching the field coil current OFF temporarily.

In another embodiment the system includes means for switching the reference voltage on the comparator between a high voltage and a low voltage so that the reference voltage is set at the high voltage or low voltage according to electrical load conditions and engine operating conditions, means for detecting that an ON state of the field coil current for the generator has continued for a predetermined first period of time, means for forcibly switching the field coil current to OFF for a predetermined second period of time when the above detection is made, and means for varying the first period according to the state of setting of the reference voltage.

BRIEF DESCRIPTION OF DRAWINGS

These and other objects and features of the present invention will become better understood through a consideration of the following description taken in conjunction with the drawings in which:

FIG. 3b is a more detailed version of FIG. 3a;

FIG. 4b is a more detailed version of FIG. 4a;

FIG. 6b is a more detailed version of FIG. 6a;

FIG. 15b is an expanded version of the chart of FIG. 15a;

FIG. 18b is a graph showing signals in various parts of circuit of FIG. 18a;

FIG. 20 is a circuit diagram for establishing reference voltages according to third method;

FIG. 21a and 21b are circuit diagrams for establishing reference voltages according to a fourth method;

DETAILED DESCRIPTION

The background of conventional systems has been discussed in connection with the discussion of FIGS. 1-4. It will be noted particularly from FIG. 4a and FIG. 4b that there is a significant drop in engine RPM (Ne) shortly after the application of the electric load (after this load goes from Off to On). As the quantity of electric power generated by the generator 3 increases initially, the engine RPM decreases. There is a response time in generating the needed power and, thus, there is a time period before the engine speed rises.

The concept of the present invention, and the embodiments thereof shown and described herein, functions to force the field current of the generator to be switched off for a predetermined time in a manner so as to stretch out the generator recovery time to reduce the immediate transient load on the engine, to thereby keep from reducing the RPM of the engine as much as would normally be the case. An example is a prolongation of approximately one second longer than in conventional systems, and it has been found that this can prevent the substantial drop in engine RPM. Note the Ton period in the "SW" waveform in prior art FIG. 3a as compared to the similar Ton period in FIG. 6a which includes a forced off time $t_c$ in accordance with the concepts of the present invention. Note also the waveform comparison in FIG. 15b of prior art (dashed lines) and an embodiment of the present invention (solid lines) for the curves of quantity of electric power and engine RPM (Ne). These graphs and curves provide a graphic indication of what is accomplished according to the present invention as compared to the prior art, and which results in a significant decrease in the drop in RPM (Ne) upon application of the electric load as illustrated, for example, in the Ne curve (solid line vs. dashed line) in FIG. 15b.

Figure 5:
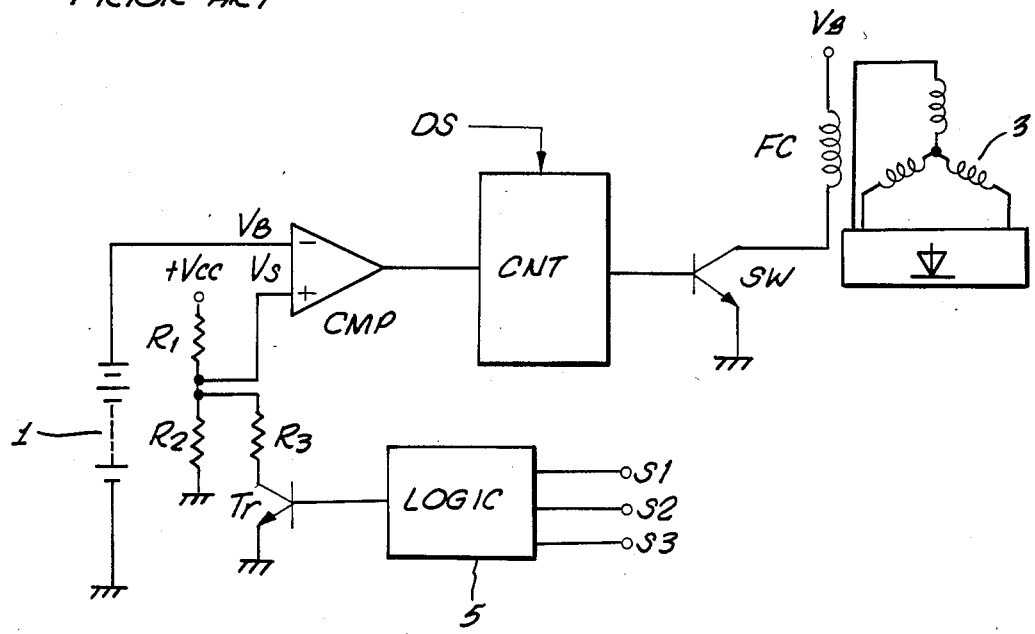
FIG. 5 is a circuit and block diagram of the circuit employed in the control system of the present invention and according to a first embodiment thereof.
Figure 4B:
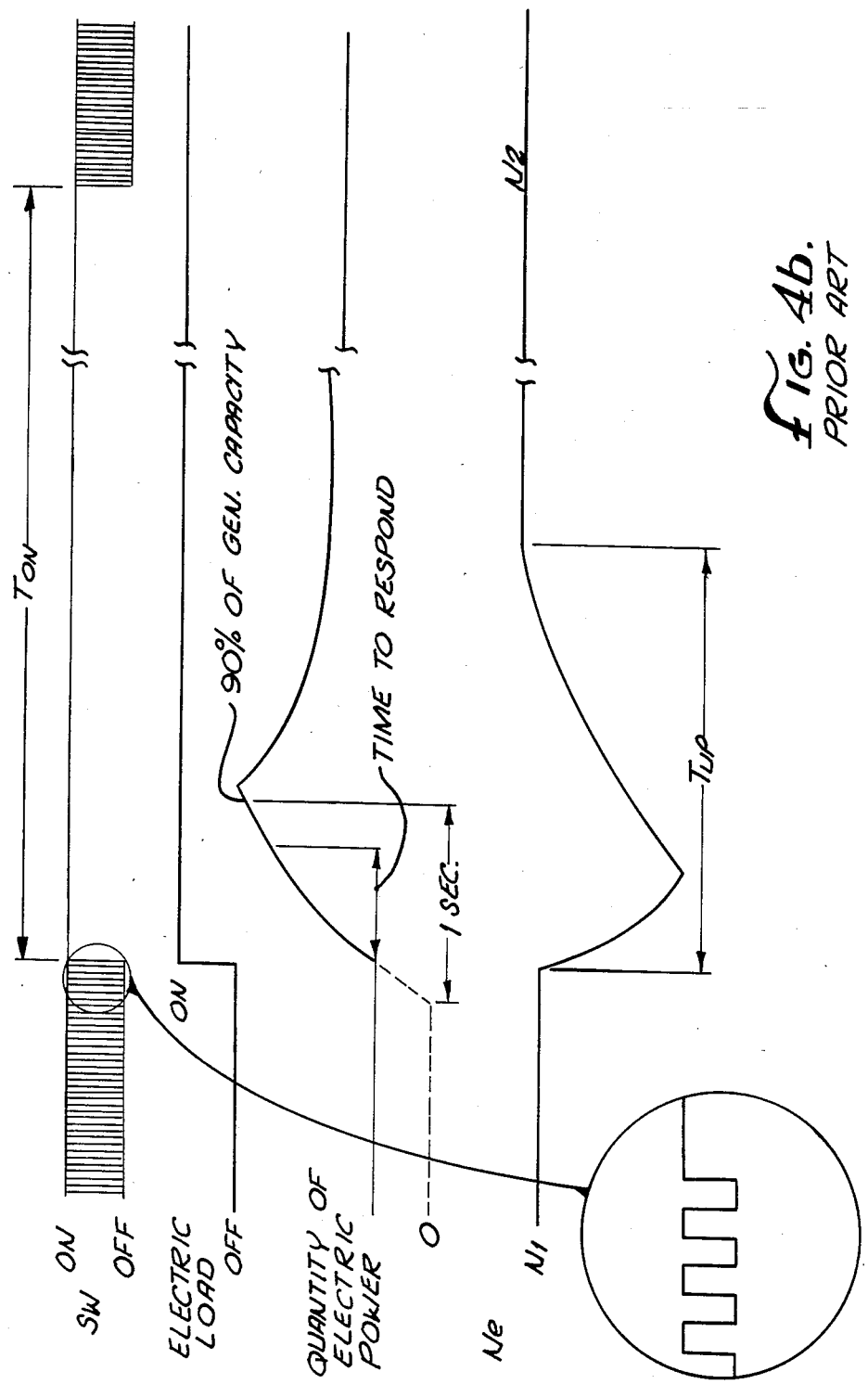

Turning now to exemplary embodiments of circuits, systems, methods and procedures according to the present invention, and first to FIG. 5, this Figure shows a combined circuit and block diagram of a first embodiment of the present invention. The circuit of FIG. 5 shows a comparator (CMP) for comparing a terminal voltage $V_B$ of the battery 1 with a predetermined generating voltage $V_S$, and a controller CNT for receiving the output signal from the comparator CMP and, in turn, controlling an ON/OFF switching device SW for switching a field coil of the generator 3 to an enhanced state.

Considering first a typical prior art operation of this type system, the reference voltage $V_S$ is set to a given voltage, for example 14.5 V, by a voltage divider comprising resistors R1 and R2, and also is set to be a second lower voltage, for example 12.5 V, by division into the resulting resistance divider of R1 and resistors R2 and R3. The resistor R3 can be connected in parallel with the divider resistor $R_2$ by the transistor $T_r$ when the associated load is off (making Vs 12.5 V). The transistor switch Tr receives its control signal from a logic circuit 5 which receives signal S1 representing an air conditioner, signal S2 representing a headlight signal, and signal S3 indicating deceleration. The transistor switch is caused to turn on and off in response to the electrical load signal and engine operating condition.

Figure 1:
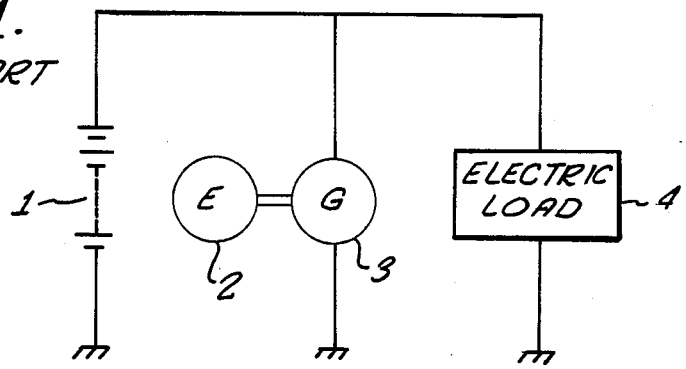
FIG. 1 is a circuit diagram showing connection between a battery, generator and electric load of a typical prior art system.
Figure 2:
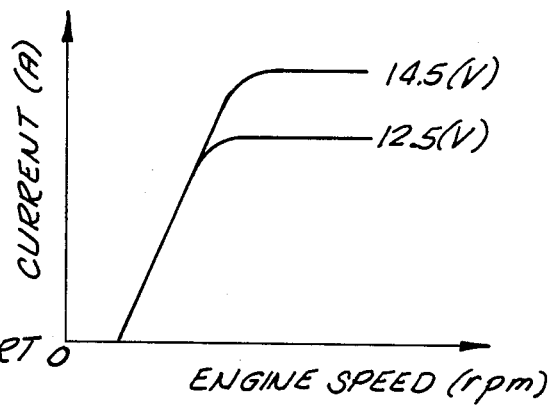
FIG. 2 is a graph showing characteristics of an output current of the generator relative to engine rotational speeds.
Figure 3A:
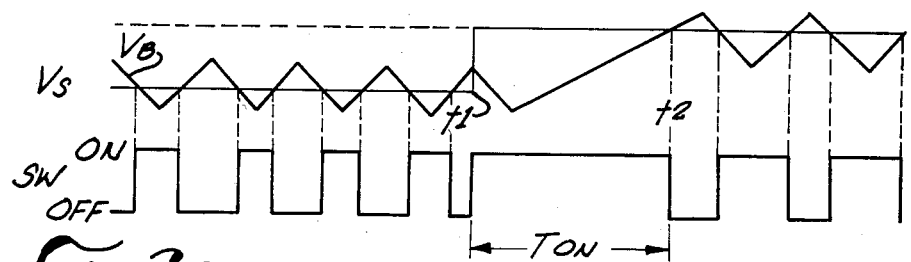
FIG. 3a is a graph showing general characteristics of the ON/OFF state of the switching device in the conventional prior art control system relative to a change in the battery voltage.
Figure 3B:
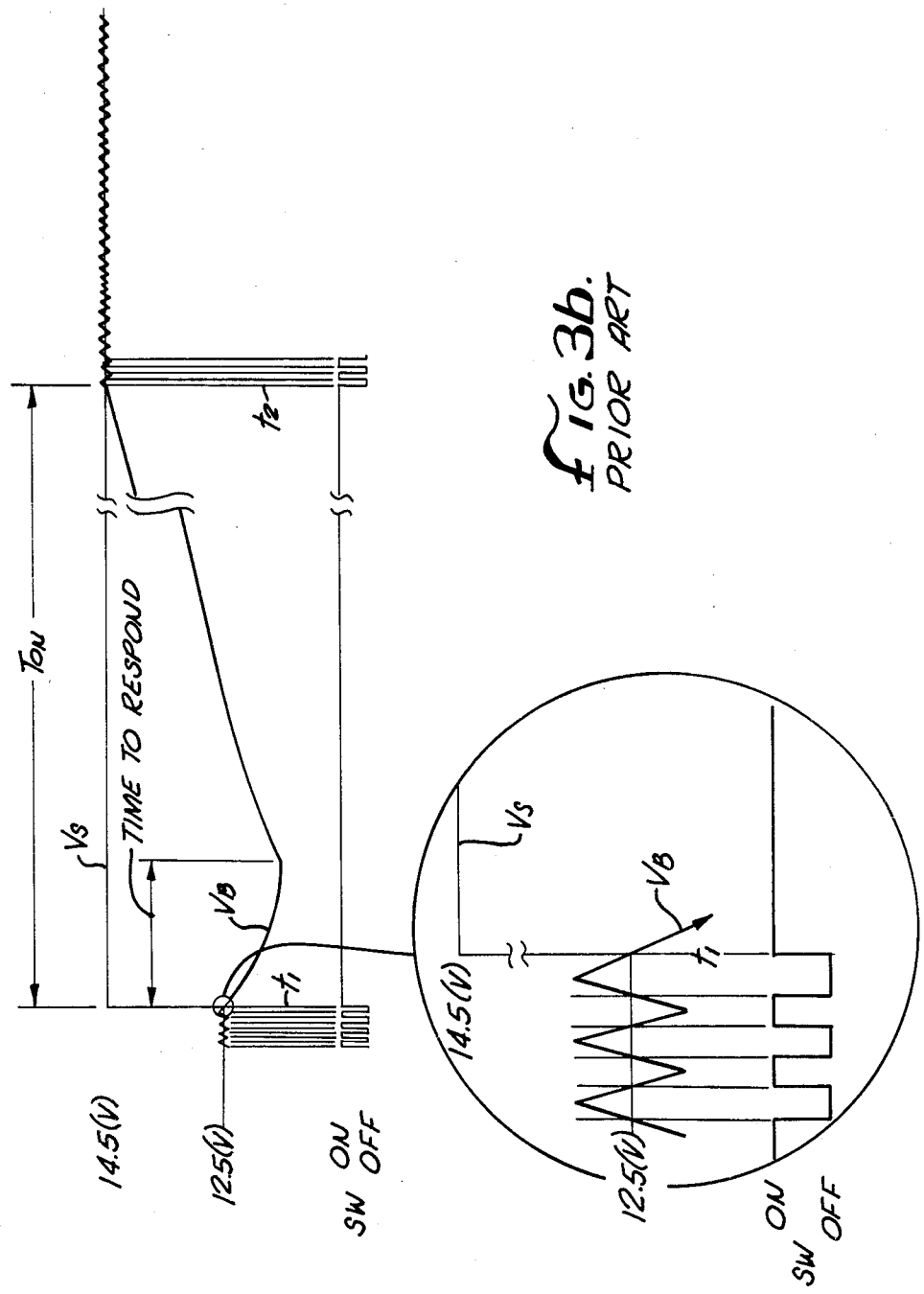

When the reference voltage $V_S$ is changed upon switching of the electric load (e.g. the air conditioner is turned on) from OFF to ON as shown in FIG. 3a, the switch SW is conventionally turned on and off as shown in FIG. 3a so that the battery voltage $V_B$ is attempted to be held to the reference voltage in response to the output signal from the comparator CMP. In this case, if $V_B$ is less than $V_S$, the output signal from the comparator CMP becomes high to cause the switching device SW to turn on. If $V_B$ is greater than or equal to $V_S$ the output signal from the comparator CMP becomes a low level signal to switch off the switching device SW. This action is shown in the bottom waveform of FIG. 3a.

Figure 4A:
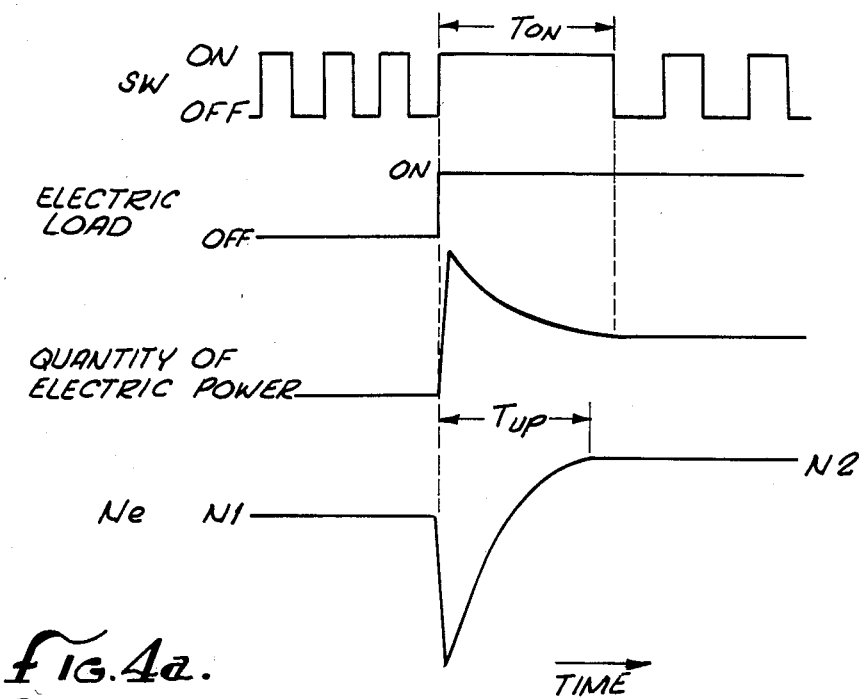
FIG. 4a is a time chart showing characteristics of the ON/OFF state of the switching device, closing condition (turning On) of the electric load, generated energy of the generator, and rotational speed (RPM or Ne) in the conventional prior art system.

However, in this simple ON/OFF switching scheme of the switch SW according to the output signal from the comparator CMP, when the electric load 4, such as an air conditioner, is turned on at t1 as shown in FIG. 3a, the switch SW goes on by switching of the reference voltage $V_S$ but a long time Ton is required until the voltage recovers to the reference voltage $V_S$ at time t2. Further, as shown in FIG. 4a, the quantity of electric power generated by the generator 3 also is rapidly increased to compensate for the rush of current upon turning on of the electric load 4. As a result, the engine operational speed Ne (RPM) is rapidly decreased, and the engine load is increased before a response time until the engine rotational speed Ne rises to a predetermined value irrespective of the idle-up control (idle increase) of the engine. Therefore, with conventional systems it is difficult to prevent a reduction in the engine speed under these conditions.

Figure 6A:
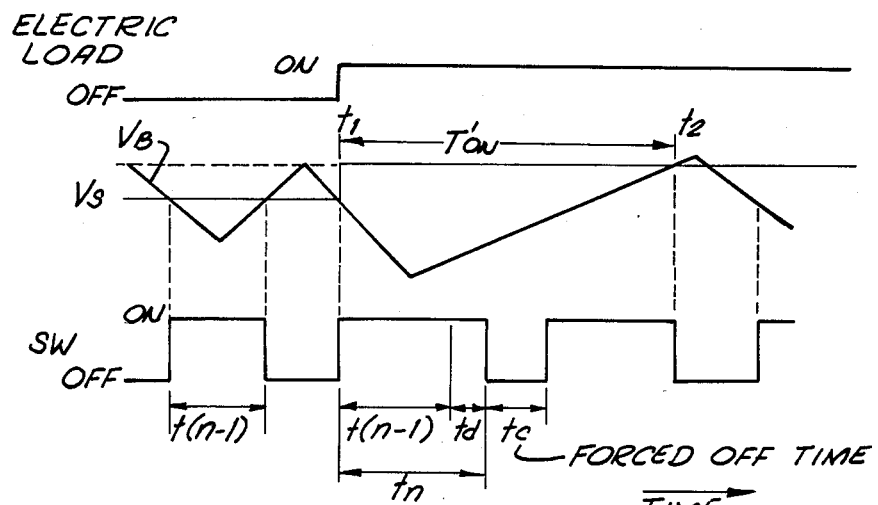
FIG. 6a is a graph showing the general characteristics of the ON/OFF state of the switching device in the control system of FIG. 5 relative to a change in the battery voltage.

According to the present invention and the embodiment of FIG. 5, the controller CNT is provided with means for measuring and holding the ON-time of the switching device SW by an internal counter, means for detecting whether or not a present ON-time becomes longer than a previous ON-time by a predetermined time, and means for temporarily forcing the switching device SW to turn off upon detection of the present ON-time This forced OFF-time is shown as tc in FIG. 6a.

Figure 7:
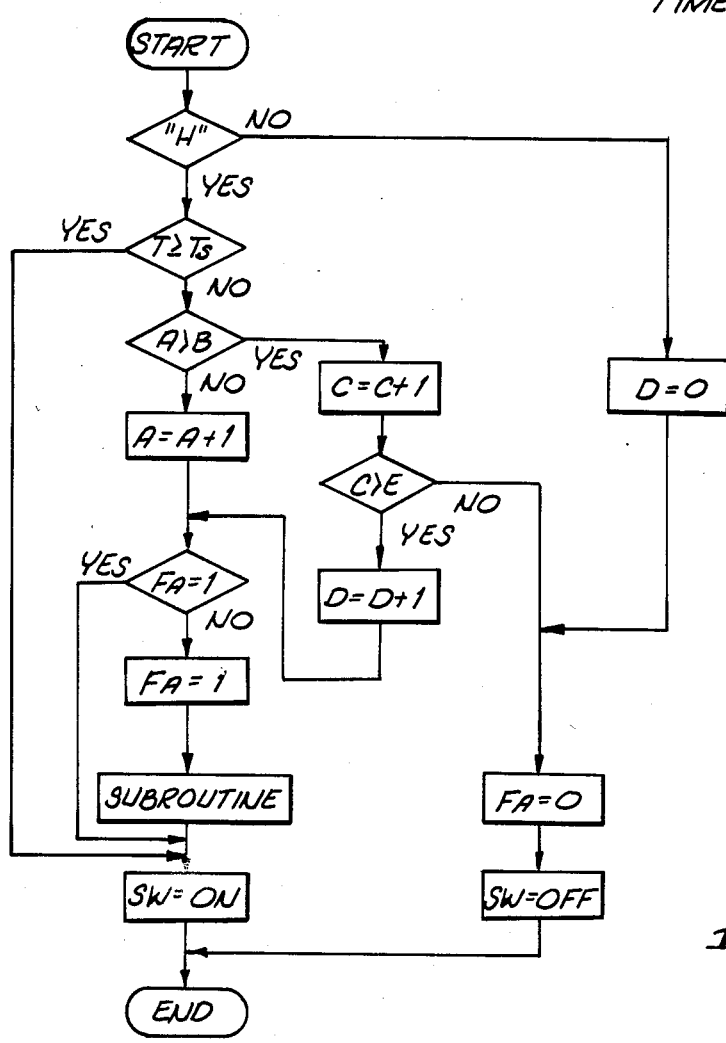
FIG. 7 is a flow chart of processing in the controller of FIG. 5.
Figure 6B:
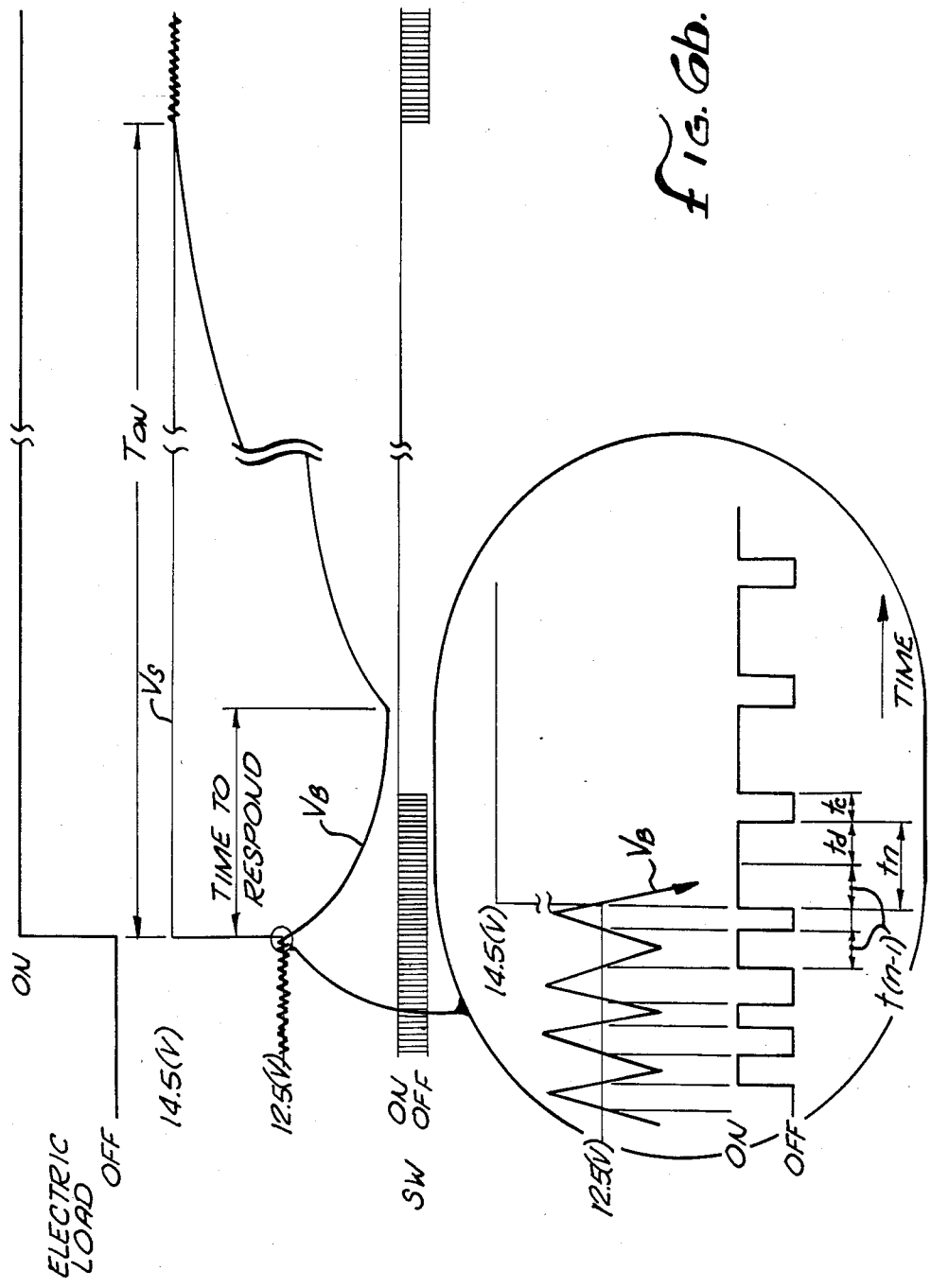
Figure 8:
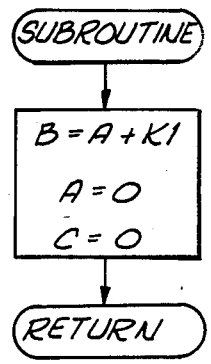
FIGS. 8-14 are examples of operation subroutines in the flow chart of FIG. 7.
Figure 9:
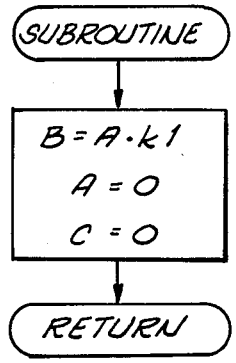
Figure 10:
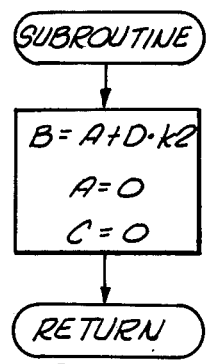
Figure 11:
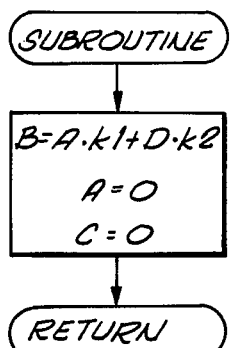

In the case that the forced OFF-time tc is provided after an ON-time comprising a previous ON-time t(n−1) and an excess time td as shown in FIG. 6a for example (these time periods equal tn which can be considered to be one type of a "control period"), a forced OFF switching is conducted several times during the period T'on, while the battery voltage $V_B$ lowers to the reference voltage VS or less, at a time t1 is recovered to the reference voltage VS again, and the ON-time is variably controlled such that the ON-time is increased every time the forcible ON-switching is repeated (where the forced OFF-time is constant) or an OFF-time is variably controlled such that the forced OFF-time is increased every time the forced OFF-time is repeated, providing that each initial value of td and tc is preliminarily set. In this case, the following various techniques will provide a variable ON-time or a variable OFF-time. FIG. 7 is a flow chart and FIGS. 8–14 are subroutines used in this flow chart (all to be described later) for implementing the several methods described below.

In the case where the ON-time is to be variably controlled, a first method (FIG. 7 and subroutine of FIG. 8) can define the present On time td as a function of the previous time td(n−1), that is, td=f[td(n−1)], and the present time td (B in FIG. 8) is set to the sum of the previous time td(n−1) (A in FIG. 8), and a constant time K1, so that the time td may be additively increased every constant time K1.

As a second method (FIG. 9), the relation, td=f[td(n−1)]is defined, and the present time td is set to be the product of the previous time td(n−1)and a constant coefficient k1, so that the time td may be proportionally increased at a constant rate.

As a third method (FIG. 10), the present time td is defined as a function of a frequency (n) (D in FIG. 10) of the forced OFF-switching as has been conducted; that is, td=f(n), and the time td is set to be the sum of the previous time td(n−1) and the product of the frequency (n) of the forced OFF-switching and a constant coefficient k2, so that the time td may be increased at a constant rate according to the frequency (n) of the forced OFF-switching.

As a fourth method (FIG. 11), the present time td is defined as a function of the previous time td(n−1) and the frequency (n) of the forced OFF-switching, that is, td=f[td(n−1)], n], and the present time td is set to be the sum of the product of the previous time td(n−1) and the constant coefficient k1 and the product of the frequency (n) and the constant coefficient k2, so that the time td may be increased at a constant rate according to (i) the previous time td(n−1) and (ii) the frequency of the forcible OFF-switching.

In the case that the Off-time is variably controlled (instead of the ON-time as described above), a first method (FIG. 12) can define the present time tc (E in FIG. 12) as a function of the previous time tc(n−1) (C in FIG. 12), that is tc= f[tc(n−1)], and the present time tc is set to be the difference of the previous time tc(n−1) and a constant time K2, so that the time tc may be decreased every constant time K2. In this case, the first method is accompanied by the aforementioned method where the ON-time td is additively increased every constant time K1.

As a second Off-time method (FIG. 13), the present time tc is defined as a function of the frequency (n) of the forced Off-switching as has been conducted, that is, tc=f(n), and the present time tc is set to the quotient of a constant coefficient k3 divided by the frequency (n) of the forced Off-switching, so that the time tc may be decreased at a constant rate according to the frequency (n) of the forcible Off-switching. In this case, the second method is also accompanied by the aforementione method where the ON-time td is additively increased every constant time K1.

As a third Off-time method (FIG. 14), the present time tc is defined as a function of the previous time tc(n−1) and the frequency (n) of the forced Off-switching, that is, tc=f[tc(n−1), n] and the present time tc is set to be the difference of the product of the previous time tc(n−1) and a constant coefficient k4 and the product of the frequency (n) and the constant coefficient k2, so that the present time tc may vary at a constant rate according to: (i) the previous time tc(n−1) and (ii) the frequency (n) of the forcible Off-switching. In this case, this third method is also accompanied by the aforementioned method where the On-time td is additively increased every constant time k1.

As is discussed above, in ON/OFF control of switching to the higher power generating level of the generator 3, when a relatively large electric load 4 is turned on and switched to the larger generating level under a high output torque operational condition of the engine 2, the engine 2 is little influenced by the generator load such that a rotational speed of the engine is reduced. Therefore, according to one embodiment of the invention, the controller CNT has means for detecting a high output torque operational condition of the engine 2 by an operational condition signal DS, along with means for releasing the forced Off-switching of the switching device SW upon detection of the high output torque. Stated differently, if the output torque is high, this routine is not followed since it is not necessary.

The high output torque operational condition of the engine 2 from the operational condition signal DS can be derived as follows. An operational speed Ne of the engine 2 or the generator 3 is employed as the operational condition signal DS, and the actual detected rotational speed Ne of the engine 2 is compared with a predetermined reference rotational speed Ns (1000 rpm for example). Then, if Ne is greater than or equal to Ns, it is considered that the output torque of the engine 2 is not lower than a predetermined value.

In another way, a throttle opening degree $\theta_t$ (or an accelerator opening degree) is employed as the operational condition signal DS, and the detected throttle opening degree $\theta_t$ is compared with a reference opening degree $\theta_s$ (10 degrees for example). Then if $\theta_t$ is greater than or equal to $\theta_s$, it is determined that the output torque of the engine 2 is not lower than a predetermined value.

In a further way, an intake manifold pressure of the engine 2 is employed as the operational condition signal DS, and the detected engine vacuum $P_B$ is compared with a predetermined reference pressure $P_S$ (400 mmHg, for example). Then, if $P_B$ is greater than or equal to $P_S$, it is determined that the output torque of the engine 2 is not lower than a predetermined value.

Turning now to FIG. 7, this Figure is a flow chart showing processing in the controller CNT in one embodiment. The flow chart, and subsequent subroutines, can be implemented in a microprocessor in the controller CNT in a conventional manner as will be readily apparent to those skilled in the art. In the flow chart of FIG. 7, it is first determined whether or not an output signal from the comparator CMP is a high level H, that is, an On-command for the switching device SW. Then, if the output signal is the high level H, it is determined whether or not an output torque T of the engine 2 is not lower than a fixed torque $T_S$.

If the torque T is greater than or equal to $T_S$, the switching device SW is held in the On-condition If T is less than $T_S$, a count value A of a td ON-time counter for measuring the time td (the td counter is in the controller CNT) is compared with a set value B for the time td. It should be noted that this torque step (T greater than or equal to $T_s$) preferably is used but is not necessary; that is, the method can progress from H=yes to the A>B step.

If A is less than or equal to B, the count value A is incremented, and it is determined whether or not a flag Fa for setting the times td and tc is set. If the flag Fa is set, an On-signal is fed to the switching device SW to switch the field coil FC of the generator 3 to an enhanced state. If the flag Fa is not set, the flag Fa is set and program goes to an operation subroutine (discussed below), where the times td and tc are reset. Then, the On-signal is fed to the switching device SW.

If A is greater than B, a content in a tc counter for measuring the time tc (the tc counter is in the controller CNT) is incremented to give a count value C, and the count value C is compared with a set value E for the time tc. Then, if C is greater than E, a content in an n-counter for counting the frequency (n) of the forced Off-switching (the n-counter in th controller CNT) is incremented, and it is determined whether or not the flag Fa is set. Thereafter, the same processing as described above is conducted. If C is less than or equal to E, the flag Fa is reset to 0, and an Off-signal is fed to the switching device SW to hold field system of the generator 3 in an off or broken condition.

On the other hand, if the output signal from the comparator CMP is a low level L, the content in the n-counter is set to zero, and the flag Fa is reset to 0. Then, the Off-signal is fed to the switching device SW.

In the above-mentioned processing, the td counter and tc counter function as a soft timer (flow chart cycle) for effecting soft (gradual) generation of the generator 3. Further, each of A, B, and Fa is initially set to zero.

Figure 12:
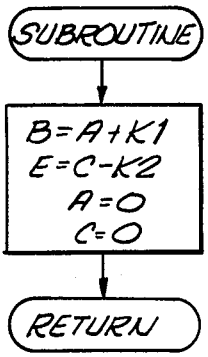
Figure 13:
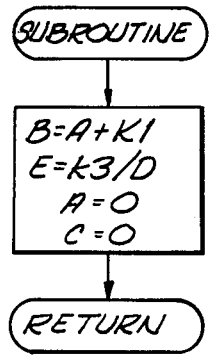
Figure 14:
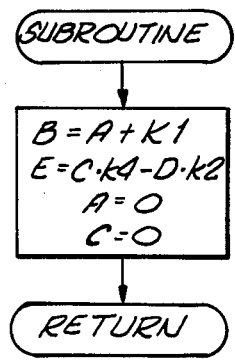

FIGS. 8 to 11 show the content of each operation subroutine (the "subroutine" in FIG. 7) in using the first to fourth methods in the case of variable control of the On-time as described above. FIGS. 12 to 14 show the content of each operation subroutine in using the first to third methods in the case of variable control of the Off-time as described above.

Figure 15A:
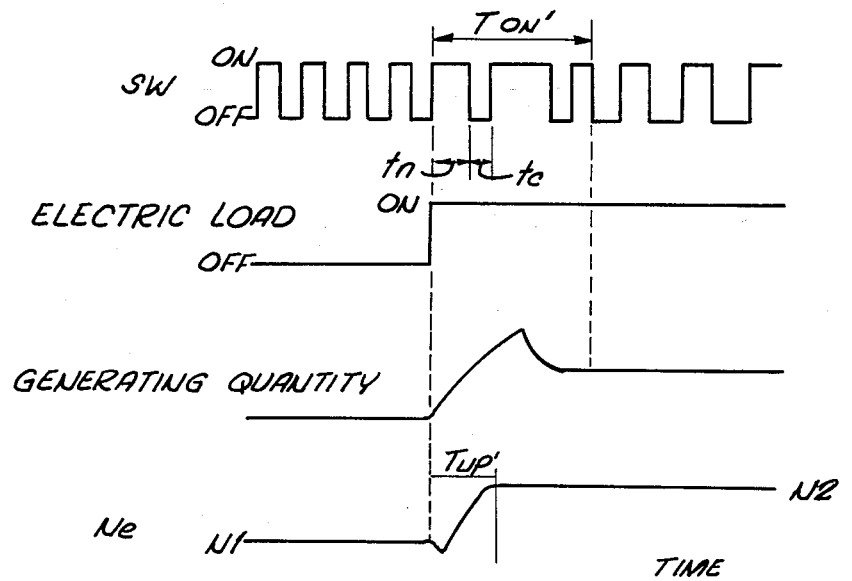
FIG. 15a is a time chart showing characteristics of the ON/OFF state of the switching device, closing condition (turn On) of the electric load, generated energy of the generator, and engine rotational speed (Ne) in the control system of FIG. 5.

According to the preceding embodiment of the invention, when the battery voltage is reduced, and a switching time from the low generating level to the high generating level in the generated energy of the generator 3 is made long, the generated energy of the generator is temporarily forcibly switched to the low generating level so that the switching time to the high generating level may be gradually increased, and in association with this, a gradual increase in generation of the generator occurs. Accordingly, as shown in FIG. 15a, even when a large electric load 4 is turned on, the generated energy of the generator 3 is prevented from being rapidly increased as conventionally occurs. As a result, the load on the engine 2 is lightened to prevent the engine rotational speed Ne from being rapidly decreased. FIG. 15b, which was discussed earlier, is a more detailed graph of the curves of FIG. 15a. Further, in controlling idle-up of the engine 2, a response time $T_{up}'$; when the engine rotational speed Ne rises to a predetermined value, may be shortened thereby to attain highly responsive idle-up of the engine 2. Furthermore, especially under the high output torque operational condition of the engine 2, the generator 3 is temporarily forcibly switched to the OFF level during the On-state of the field current of the generator 3 to release the gradual generation of the generator. Therefore, the battery 1 may be efficiently charged without injuring the responsiveness of the engine.

Thus, in accordance with the invention and the foregoing embodiment, when the field current of the charging generator is controlled to be switched On and Off so as to try to maintain the battery voltage equal to the reference voltage, and the generator is switched to its high generating level upon closing of a large electric load, it is possible to effectively prevent rapid application of load to the engine.

Figure 16:
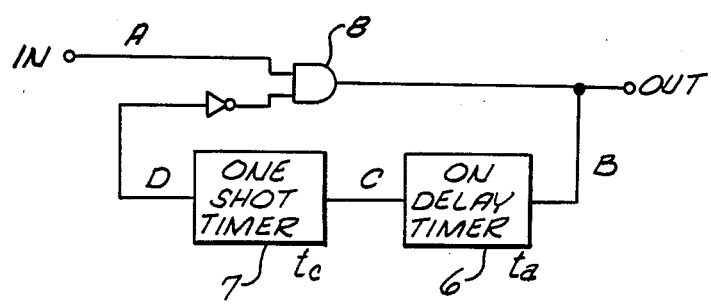
FIG. 16 is a general block diagram of a controller according to another embodiment of the present invention.
Figure 18A:
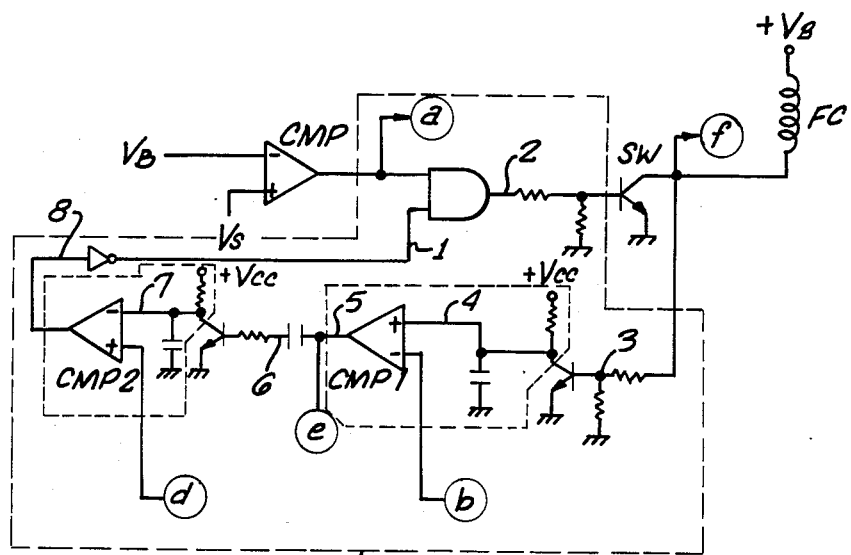
FIG. 18a is a more detailed circuit and block diagram of the controller of FIG. 16.

Turning now to the second embodiment of the concepts of the present invention, FIG. 16 shows a generalized block diagram, and FIG. 18a shows a more detailed block diagram, of a hard wired system according to the present invention. In this system, the controller includes means for counting and retaining the On-period of the field coil, means for detecting that the On-period of this time is longer than that of the last time by a predetermined length of time, and means for forcibly switching the field coil current Off temporarily. The system is similar to that of the previously described FIG. 5 but the controller CNT (shown in FIG. 16) is hard wired to perform its various functions rather than program controlled. In the present embodiment, the controller CNT as shown in FIG. 16 (and also shown in greater detail in FIG. 18a) functions to count the On-period of time of the switching element SW, detects whether the On-period of this time is longer than the On-period last time by a predetermined length of time, and forcibly turns off the switching element SW when this decision is made. Thus, if the present On-time is longer than the last On-time, the switch SW is turned off.

Figure 17:
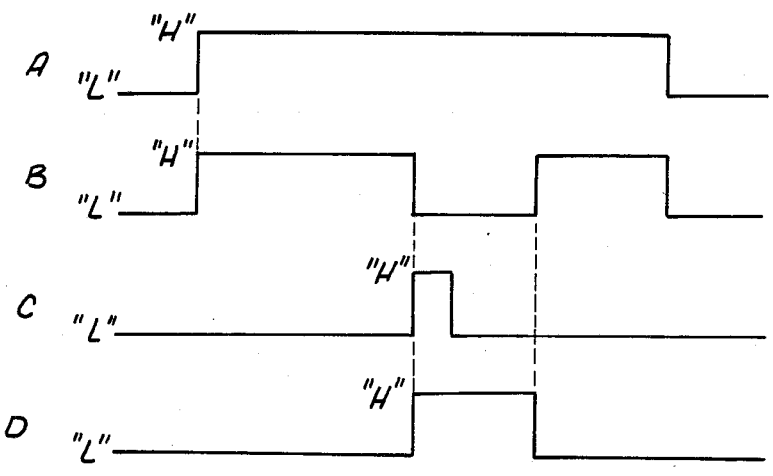
FIG. 17 is a time chart showing various signals in the controller of FIG. 16.

The CNT circuit of FIG. 16 includes an On-delay timer 6 to be triggered by an ON/OFF signal output B for the switching element SW which is supplied from output of the circuit, a one-shot timer 7 (set time tc) to be triggered by the timer output C of the timer 6, and an AND circuit 8 to generate a logical product of an inverted signal of the timer output D of the timer 7, and the output A of the comparator CMP which is supplied to the input terminal of the circuit The time chart of these signals is shown in FIG. 17 wherein L means low and H means high.

With the above described structure, if, as shown in FIG. 6a, for example, an electrical load pulling in a large rush current is turned on at time t1 and the battery voltage $V_B$ is thereby caused to sharply drop and it takes a relatively long time T'on until its voltage is restored to the reference voltage $V_S$ at the time t2, then the On-period of the switching element SW will become longer than the set time ta of the timer 6. Thus, when the time ta has elapsed after the time t1 (e.g., tn), the switch SW will be forced off through operations of the timers 6 and 7.

Figure 18C:
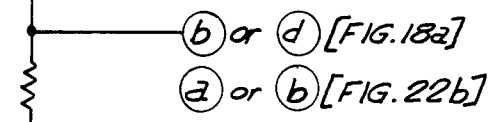
FIG. 18c is a circuit diagram illustrating the manner in which certain reference voltages are established for, inter alia, a first operating method according to the second embodiment of the present invention.
Figure 18B:
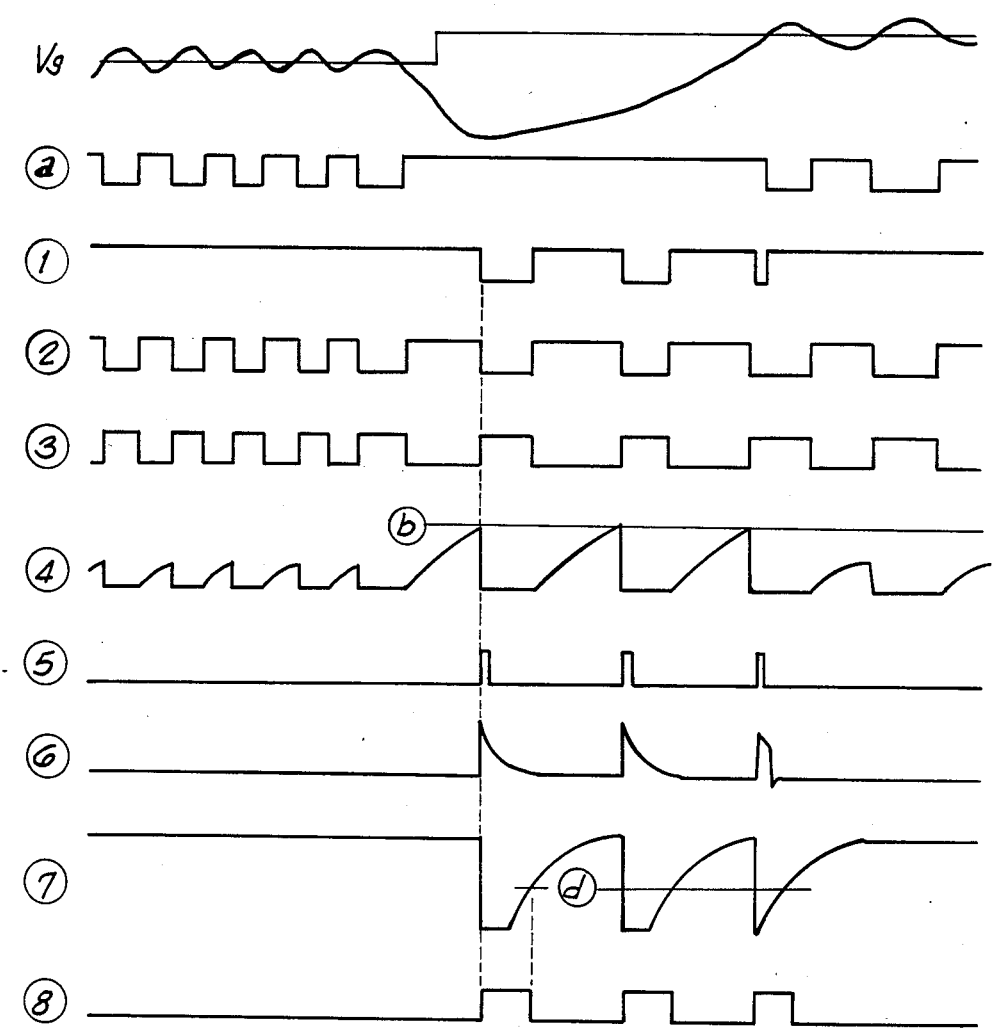

A detailed example of a circuit for the comparator CMP, controller CNT, switching element SW, and the field coil portion FC is shown in FIG. 18a. FIG. 18b shows various waveforms and signals at different points in the circuit of FIG. 18a.

Referring again to FIG. 6a, various methods and systems can be used to produce forced turnin-off of switch SW within the period T'on from the time t1 when the battery $V_B$ drops below the reference voltage $V_S$ to the time t2 when the voltage is restored to the reference voltage $V_S$ by the turning ON of the switch SW as described below.

A first method makes the times ta and tc always constant even if several forced Off-times occur during the period T'on. This is attained simply by connecting the potential of the dividing point in the resistance type voltage divider circuit of FIG. 18c to each of the comparators CMP1 and CMP2 in the circuit arrangement of FIG. 18a as the reference voltage (b and d) for each comparator.

Figure 19A:
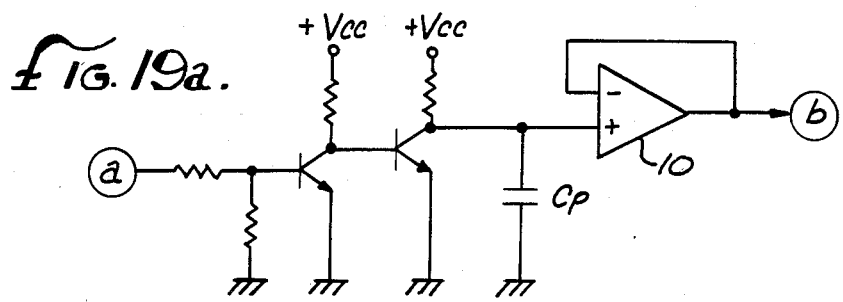
FIG. 19a-19d are circuit diagrams of circuits for establishing other reference voltages according to a second method for the second embodiment.

A second method, while keeping the time tc constant, makes the time ta a function of the actual time t, i.e., ta= lapse of time as long as the ON command of high-level H is kept on at the output (a) of the comparator CMP. This is attained by employing an RC timer circuit as shown in FIG. 19a in which a capacitor $C_p$ is adapted to be charged at a predetermined RC time constant when the output signal of the comparator CMP is at high level H and the capacitor $C_p$ is adapted to discharge when the output signal of CMP is a low level L and by taking out the potential of the capacitor $C_p$ via an operational amplifier 10 to be supplied (as reference b) to the comparator CMP1 of the circuit arrangement of FIG. 18a as its reference voltage. In this case the reference (d) of the comparator CMP2 in the circuit arrangement of FIG. 18a is the voltage derived from the voltage dividing point in the circuit of FIG. 18C.

Figure 19B:
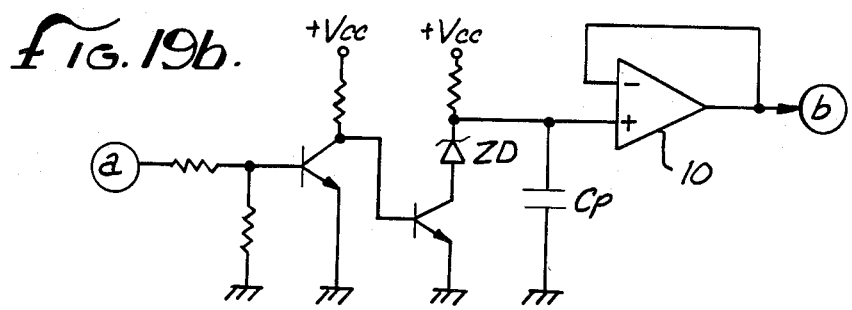

When the second method is employed, it is preferable that a zener diode ZD be inserted in the circuit as shown in FIG. 19b, thereby to provide the capacitor $C_p$ with an initial value.

Figure 19C:
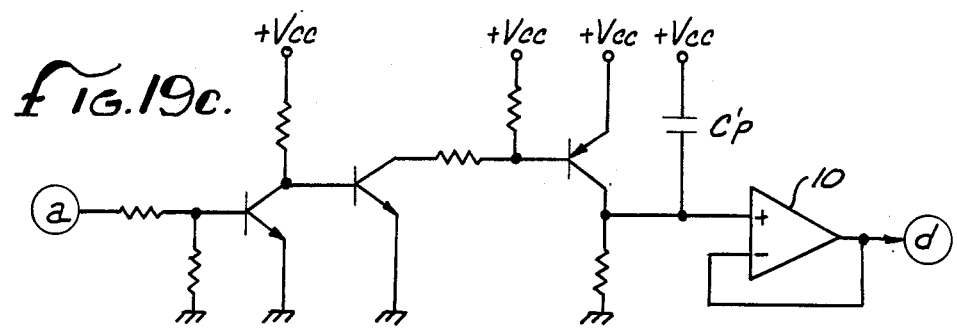
Figure 19D:
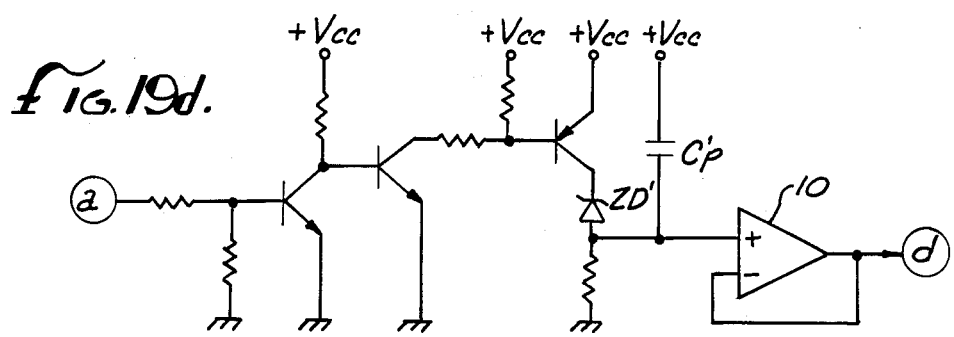

Alternatively, in carrying out the second method, it is also possible to keep the time ta constant, not prolonged with the lapse of time and, instead, to make the time tc a function of the time t, i.e., tc=f(t), whereby the time tc is allowed to be decreased as time goes by as long as the On command on high level H is provided from the output of the comparator CMP. In this case, the circuit arrangement as shown in FIG. 19c can be used and its output voltage (d) may be supplied to the comparator CMP2 in the circuit arrangement of FIG. 18a as its reference voltage value (d). Also it is preferable to use the circuit arrangement of FIG. 19d in which a zener diode ZD' is inserted for providing the capacitor $C'_p$ with an initial value.

In a third method both the times ta and tc are made to become functions of the battery voltage $V_B$, i.e. ta=tc=f($V_B$), and thus, the times ta and tc vary as the battery voltage $V_B$ varies in such a way that times ta and tc are shortened as the battery voltage $V_B$ drops. In this case, a comparator CMP 3 as shown in FIG. 20 is used which makes the reference voltage (b or d) variable in response to the comparison output between the battery voltage $V_B$ and the reference voltage. Its output may be supplied to either of the comparators CPM1 and CPM2 in the circuit arrangement of FIG. 18a as its reference voltage.

In practicing the third method, it is also possible, while keeping the time ta constant, to make only the time tc variable according to the voltage $V_B$ Or, it is also possible, while keeping the time tc constant, to make only the time ta variable according to the battery voltage $V_B$.

A fourth method is such that, while the time ta is kept constant, the time tc is made variable as a function of the number of times the forced turning off of switch SW occurs, i.e., i.e. tc=f(n), and the time tc is adapted to be uniformly prolonged with an increase of the number of repetitions of the ON/OFF switching. In this case, a circuit as shown in FIG. 21a can be employed which forms a charging circuit to charge the capacitor Ct as long as the output (a) from the comparator CPM remains ON at the high level H and forms a discharging circuit for the capacitor Ct having a predetermined time constant when the switching element SW is turned OFF while the output signal from the comparator CPM is held at the high H level. The potential of the capacitor Ct may be taken out through an operational amplifier 10 and supplied (at d) to the comparator CPM 2 in the circuit arrangement of FIG. 18a as its reference voltage.

A fifth method is such that, when the ON time ta is made variable with the lapse of time t as in the second method, the time tc is further made variable as a function of the time ta, i.e., tc=f(ta), and thus, the time for the forced turning OFF, tc, is made variable according to the preceding time ta, so that the time tc becomes shorter the longer the time ta becomes In the present case, a circuit arrangement as shown in FIG. 21b can be employed in which a charging circuit with a preset-ermined time constant for the capacitor $C'_p$ is formed when the output signal from the comparator CMP1 in the circuit arrangement of FIG. 18a is a low L level as long as the output signal of the comparator CPM is held at a high H level, and a discharging circuit with a predetermined time constant for the capacitor $C'_p$ is formed when the output signal of the comparator CMP1 is switched to the high H level and for which a circuit is provided forcedly to reset the capacitor $C'_p$ when the switching element SW is turned OFF. The potential of capacitor $C'_p$ may be taken out through an operational amplifier and supplied (at d) to the comparator CMP2 in the circuit arrangement of FIG. 18a as its reference voltage value.

In the described manner, as the battery voltage drops and the period of time during which the field coil current in the generator 3 is held ON becomes longer, the system of the present invention causes the field coil current in the generator to be forcedly cut off temporarily to gradually prolong the period during which the generator is switched to the high power generation mode and thereby to allow the generator to perform soft or gradual generation. Therefore, as shown in FIGS. 15a and 15b, the usual sharp increase of the generated power quantity by the generator 3 can be eliminated even if a larger electrical load 4 is switched on. Thus, the load on the engine becomes lighter and the sudden decrease in the number of revolutions Ne of the engine is reduced. Also, when idle up control of the engine occurs (that is, when fuel is increased to bring the idle back up), the response time T'up for the number of revolutions of the engine to rise to a predetermined level can be shortened and idle up of the engine with good response can be achieved.

Another alternative embodiment is shown in FIGS. 22a-22f. These Figures show a system wherein the reference voltage on the comparator CMP is switched between the high and low voltage levels (e.g. 14.5 V and 12.5 V) so that the reference voltage for the comparator is set at the high or low voltage levels according to electrical load conditions and engine operating conditions. This system, as was the case discussed previously, includes means for detecting that the ON-state of the field coil current for the generator will continue for a predetermined first period of time, includes means for forcibly switching the field coil current Off for a predetermined second period of time when the foregoing protection is made, and includes means for varying the first period of time according to the state (high or low) of the reference voltage.

Figure 22A:
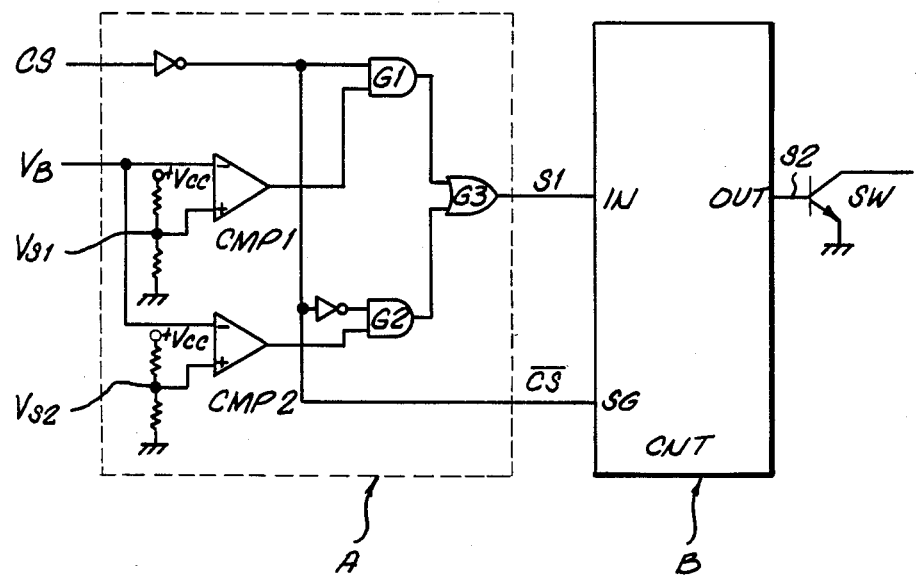
FIG. 22a is a circuit and block diagram similar to FIGS. 5 and 18a illustrating a third embodiment according to the present invention.

Turning now to FIG. 22a, this circuit or system includes a comparator (CMP) portion labelled A, including a comparator CMP1 for comparing a terminal voltage $V_B$ of the battery 1 with a reference voltage $V_{S1}$ which is set at a low voltage (for example, 12.5 V), a comparator CMP2 for comparing the battery voltage $V_B$ with a reference voltage $V_{S2}$ which is set at a high voltage (for example, 14.5 V), and an AND gate G1 implementing the logical AND operation over an inverted signal ($\overline{CS}$) of a control signal CS which is the switching signal for the generator 3 for switching between the high powe generation level and the low power generation level and the output signal of the comparator CMP1. The voltage levels $V_{S1}$ and $V_{S2}$ can be considered to be like the solid line $V_S$ in FIG. 6a and the dashed line above $V_S$ in FIG. 6a respectively. The circuit further includes an AND gate G2 implementing the logical AND operation over the control signal CS and the output signal of the comparator CMP2, and an OR gate G3 implementing the OR operation over the outputs of the AND gates G1 and G2, and a controller (CNT) portion B responsive to the output signal of the comparator A for causing the switching element SW, which controls electric current flowing through the field coil FC in the generator 3, to switch On and Off. Thus, the control signal from the controller B is an On/Off signal for the switching element SW.

With the structure of the system as described above, if the battery voltage $V_B$ varies as indicated in FIG. 3a, for example, then in the case of the prior art, the controller B reads the output signal then output from the comparator A and causes, under its control, the switching element SW to properly switch on and off so as to hold the battery voltage $V_B$ at a predetermined reference voltage $V_S$.

Referring to the comparator portion A of FIG. 22a, if the control signal CS is a low level L which is the signal for switching to the low power generation level, the low reference voltage $V_{S1}$ on the comparator CMP1 is set in the comparator, and if the control signal CS is a high level H which is the signal for switching to the high power generation level, the high reference voltage $V_{S2}$ on the comparator CMP2 is set. The circuit A is such that, if $V_B < V_{S1}$ or $V_{S2}$, the output signal of the comparator goes to the high level H and issues a command to the controller B for making or energizing the field coil FC, and if $V_B$ is greater than or equal to $V_{S1}$ or $V_{S2}$, the output signal of the comparator A becomes the low level L and issues a break command for opening or deenergizing the field coil.

However, when control is performed with such a simple arrangement to cause the switching element SW to turn On/Off just according to the output signal of the comparator A, if a large electrical load 4, such as an air conditioner, is turned on at the time t1 when the switching element SW is in the Off state and the generator 3 is in the low power generation mode as shown in FIG. 3a, then, since the electrical load becomes larger and the generator 3 is switched to the high power generation mode, it takes a long time Ton for the battery voltage $V_B$ to reach the reference voltage $V_{S2}$ at the time t2. At this time, as shown in FIG. 4a, the generated power quantity of the generator 3 abruptly increases according to the rush of current flowing into the electrical load 4 and as a result the engine revolutions Ne decrease sharply. In the case idle up control of the engine 2 is made, the response time Tup until the engine revolutions rise to a predetrmined level becomes considerably long. Since, specifically, setting to the high reference voltage $V_{S2}$ is made in the comparator A at that time, the variation in the load exerted on the engine 2 becomes greater.

Accordingly, the controller B in the present embodiment (FIG. 22a) is provided with means for detecting that the On state of the switching element SW has continued for a predetermined period of time, means to forcedly turn Off the switching element SW temporarily when the above detection is made, and means for varying the above mentioned predeterined period of time and the forced turning Off period of SW according to the set state in the comparator A of the reference voltage to be switched between the high voltage level and the low voltage level.

FIG. 16 which was discussed earlier shows an example of the structure of the controller B used in this embodiment also, but the detailed circuit is different from those previously shown and described. This new circuit is shown in FIG. 22b, along with the circuits of FIGS. 22c-f which provide appropriate signals.

Referring again to FIG. 6a, various methds are implemented by the circuits of FIG. 22b-f to produce the forced turning Off of SW by means of the timers whose timer times are ta and tc within the period Ton from the time t1 when the battery voltage $V_B$ is lowered below the reference voltage $V_{S1}$ to time t2 when the voltage reaches the reference voltage $V_{S2}$.

The first method is such that the time tc is made constant, and when the On command for the switchng element SW is output from the comparator A, the time ta is adapted to be shortened as long as the high reference voltage $V_{S2}$ is set in the comparator A, whereby the ratio of the forced Off period in the total period is made larger to suppress the power generation by the generator 3.

Figure 22B:
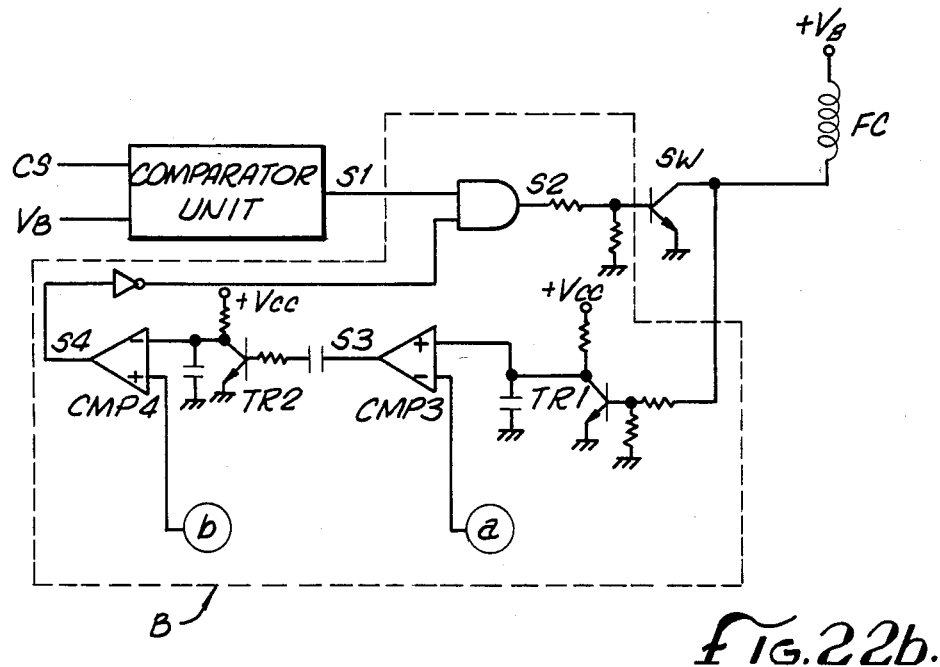
FIG. 22b is a block and circuit diagram of the third embodiment of the present invention.
Figure 22C:
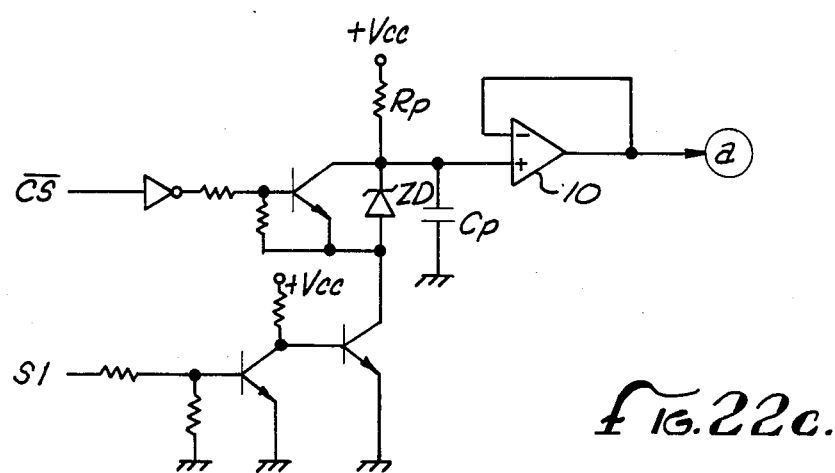
FIG. 22c through FIG. 22e are circuit diagrams showing examples of the reference voltage establishing circuits for the comparators in the circuit of FIG. 22b.

The implementation of this method is by the circuit of FIG. 22c (with the circuit of FIG. 22b). If the output signal S1 of the comparator A supplied to the input terminal IN of the controller B (FIG. 22a) becomes the low level L, the capacitor $C_p$ (FIG. 22c) is brought to a discharged state, and if it becomes the high level H, this capacitor is brought to a state to be gradually charged at the time constant determined by $R_p$ and $C_p$, but when the inverted signal of the control signal CS, which is supplied to the SG terminal of the controller B is at the low level L, the charging voltage starts virtually at ground potential, and when the CS signal is at the high level H, it is well remedied by such arrangement that the potential of the capacitor $C_2$, the charging on which starts at the initial voltage determined by the zener voltage of the zener diode ZD, is taken 7out or discharged through the operational amplifier 10 and supplied (at a) to the comparator CMP3 in the circuit arrangement in FIG. 22b as the reference voltage therefor. In the present case, the reference voltage for the comparator CMP4 in the circuit arrangement in FIG. 22b is provided from the voltage dividing point as shown in FIG. 18c.

The second method is such that the time ta is made constant, and when an On command for the switching element SW is output from the comparator A, the time tc is adapted to be prolonged as long as the high reference voltage $V_{S2}$ is set in the comparator A, and thus the ratio of the forced Off period in the total period is made larger and the power generation quantity of the generator 3 is thereby suppressed.

Figure 22D:
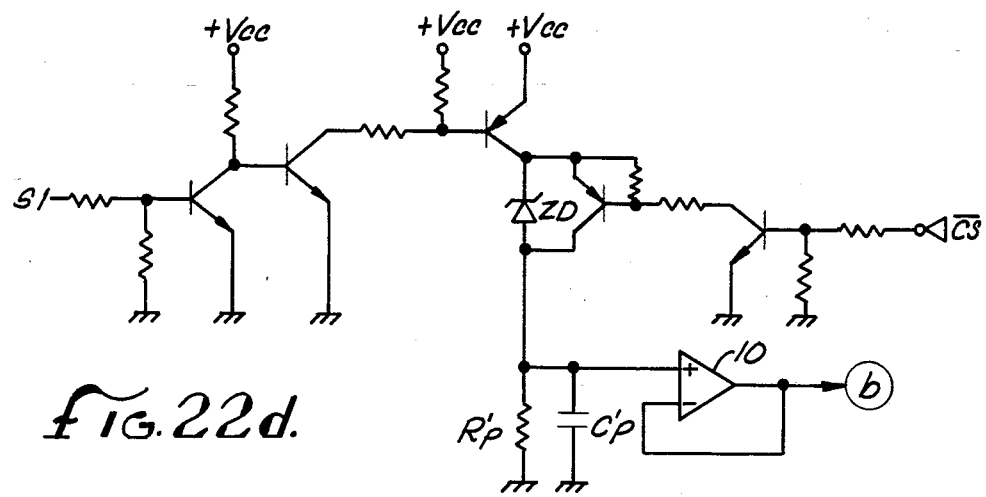

This second method is implemented by the circuit of FIG. 22d. When the output signal S1 of the comparator A input to the input terminal IN of the controller B becomes the low level L, the capacitor $C'_p$ in FIG. 22d supplies the initial voltage to be determined by existence or nonexistence of the voltage drop given by the zener voltage of the zener diode ZD supplied to the capacitor $C'_p$, and as the signal S1 changes to the high level H, the capacitor $C_p$ is brought to a state to gradually discharge at the time constant determined by the capacitance $C_p$ and the resistance $R'_p$. The voltage drop due to the zener diode ZD becomes nil when the inverted signal $\overline{CS}$ of the control signal CS, which is input to the terminal SG of the controller B, becomes the low level L, and when the same becomes the high level H, it becomes existent. In this case, the potential at the voltage dividing point in the circuit of FIG. 18c can be supplied to the comparator CMP3 in the circuit arrangement in FIG. 22b as the reference voltage therefor.

Figure 22E:
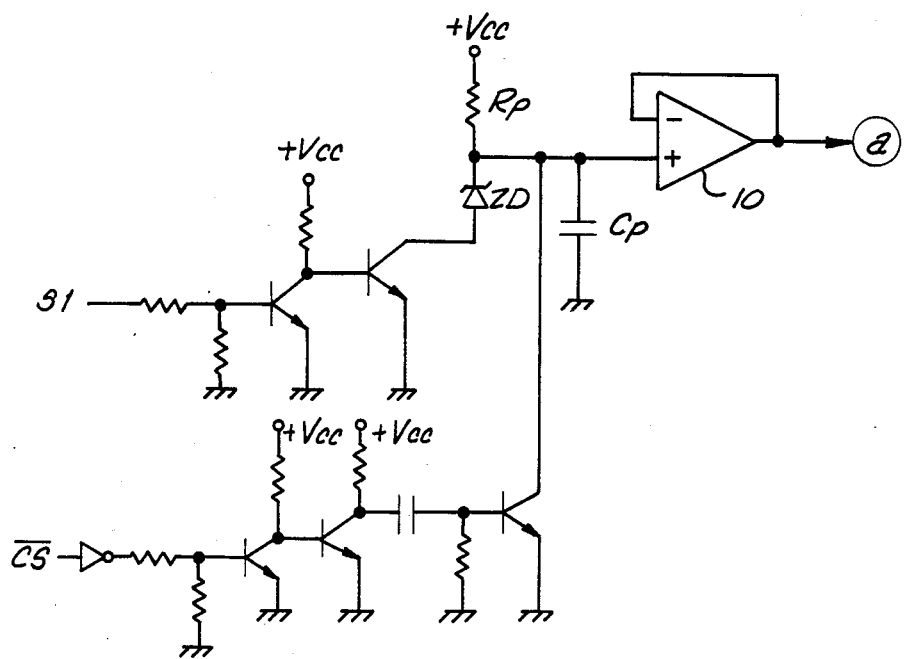

The third method is such that the time tc is made constant, and at the time when an ON command for the switching element SW is output from the comparator A, the time ta is adapted to be shortened when switching from the low reference voltage $V_{S2}$ in the comparator A. In the method as shown in FIG. 22e, when the output signal S1 of the comparator A to be supplied to the input terminal IN of the controller B is at the low level L, the capacitor $C_p$ is supplied with the initial voltage determined by the zener voltage of the zener diode ZD except when the inverted signal $\overline{CS}$ of te control signal CS is switched from the high level H to the low level L, and the capacitor is brought to the state to discharge at the time constant determined by $R_p$ and $C_p$ when the output signal Sl becomes the high level H. On the other hand, when the signal CS is switched from the high level H to the low level L, the initial voltage for the capacitor $C_p$ is virtually lowered to ground potential. The potential of the capacitor $C_p$ can be taken out through the operational amplifier 10 and applied to the comparator CMP3 as the reference voltage therefor.

The fourth method is such that the time ta is made constant, and at the time when an On command for the switching element SW is output from the comparator A, the time tc is adapted to be prolonged when switching from the low reference voltage $V_{S1}$ to the high reference voltage $V_{S2}$ in the comparator A.

Figure 22F:
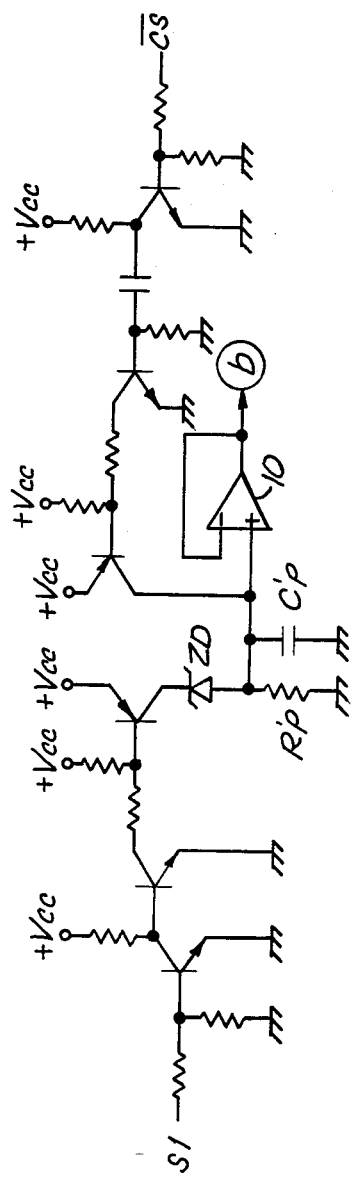

In this fourth method, as shown in FIG. 22f, when the output signal S1 of the comparator A which is input to the input terminal IN of the controller B is at the low level L, the capacitor $C'_p$ supplies the initial voltage determined by the zener voltage of the zener diode ZD to the capacitor $C'_p$ except when the inverted signal $\overline{CS}$ of the control signal CS is changed over, and when the signal S1 becomes the high level H, the capacitor is brought to the state to gradually discharge at the time constant determined by $C_p$ and $R_p$. On the other hand, when the signal CS is switched from the high level H to the low level L, the initial voltage of $C_p$ is virtually lowered to $+V_{CC}$. The potential on the capacitor $C_p$ of the RC timer unit can be taken out through the operational amplifier and applied to the comparator CMP4 in the circuit arrangement in FIG. 22b as the reference voltage (b) therefor.

In the described manner, as the battery voltage drops and the period of time during which the field coil current of the battery 3 is held On becomes longer, the system of the present embodiment causes the power generation quantity of the generator 3 to be temporarily suppressed by force, and soft or gradual generation of the generator 3 may be performed avoiding exertion of an abrupt load on the engine. Therefore, as shown in FIG. 15a, the sharp increase of the generated quantity by the generator 3 can be eliminated even if a large electrical load 4 is added. Therefore, as shown in FIG. 15a, the sharp increase of the generated quantity by the generator 3 can be eliminated even if a large electrical load 4 is added. Thus, the load on the engine becomes lighter and the sudden decrease in the number of revolutions Ne of the engine is avoided and when idle up control of the engine occurs, the response time Tup for the number of revolutions of the engine to rise to a predetermined level can be shortened and an idle up of the engine with good response can be accomplished. Therefore, a significant advantage is obtained therefrom that the engine is effectively prevented from being subjected to an abrupt burden when the generator is switched to the high power generation made upon turning on of a large electrical load.

The term "control period" is used herein to include the period being sensed, such as a period comprising the last On period (t(n−1)in FIG. 6a) plus the predetermined period or time (such as td in FIG. 6a), or a given or predetermined period of time alone, and/or other variations as described herein, or the like.

While several embodiments of the present invention have been shown and described, various changes and modifications can be made without departing from the present concepts.

What is claimed is:

1. A control system for forcibly switching the field current to a field coil of an engine driven generator on and off one or more times during a transient period when an electric load coupled to the generator is switched on and begins to draw current, comprising digital control means coupled to said field coil for alternating at least once during said transient period between calculating a present on time and switching said field current on for said present on time, then calculating a present off time and forcibly switching said field current to said field coil off for set off time.

2. The system of claim 1 wherein said digital control means sets said present on time to a previous on time plus a first constant.

3. The system of claim 2 wherein said digital control means sets said present off time to a previous off time minus a second constant.

4. The system of claim 1 wherein said digital control means sets said presesnt on time to a previous on time multiplied by a first constant.

5. The system of claim 4 wherein said digital control means sets said present off time to a previous off time divided by a second constant.

6. The system of claim 1 wherein said digital control means calculates the frequency with which said digital control means is alternately switching said field current on and off during said transient period, and then sets said present on time to a previous on time plus a first constant multiplied by said frequency.

7. The system of claim 6 wherein said digital control means calculates the frequency with which said digital control means is alternately switching said field current on and off during said transient period, and then sets said present off time to a previus off time multiplied by a second constant minus said frequency multiplied by a third constant.

8. The system of claim 1 wherein said digital control means calculates the frequency with which said digital control means is alternately switching said field current on and off during said transient period, and then sets said present of time to a previous on time multiplied by a first constant and adds said frequency multiplied by a second constant.

9. The system of claim 1 wherein said digital control means detects a high output torque operational condition of said engine, and if such a condition is detected, switches said field current of said field coil on throughout said transient period.

10. The system of claim 1 wherein said digital control means is further coupled to voltage regulating means for signalling said digital control means to alternately switch said field current on and off during said transient period.

11. The system of claim 10 wherein said generator is coupled in parallel to a battery, and wherein said voltage regulating means comprises:
selecting means for selecting a high reference voltage when said electric load is switched on and begins drawing current;
comparator means coupled to said battery, said selecting means, and said digital control means for comparing the battery voltage with said high reference voltage and signalling said digital control means to alternately switch said field current on and off during said transient period while said battery voltage is less then said high reference voltage.

12. The system of claim 1 wherein said digital control means is a microprocessor coupled to a switch, wherein said switch is coupled to said field coil, and wherein said microprocessor signals said switch to alternately switch said field current on and off during said transient period.

13. A control system for forcibly switching the field current to a field coiled of an engine driven generator on and off one or more times during a transient period when an electric load coupled to the generator is switched on and begins to draw current, comprising analog control means coupled to said field coil for alternating at least once during said transient period between determining a present on time and switching said field current on for said presesnt on time, then determining a present off time, and forcibly switching said field current off for said present off time.

14. The system of claim 13 wherein said analog control means sets said present on and off times to a first and second constant respectively.

15. The system of claim 13 wherein said analog control means senses the elapsed time since the beginning of said transient period, and then sets said present off time to a constant and sets said present on time to a value directly proportional to said elapsed time.

16. The system of claim 13 wherein said analog control means senses the elapsed time since the beginning of said transient period, and then sets said present on time to a constant and sets said present off time to a value inversely proportional to said elapsed time.

17. The system of claim 13 wherein said analog control means is further coupled to voltage regulating means for signalling said analog control means to alternately switch said field current on and off during said transient period.

18. The system of claim 17 wherein said generator is coupled in parallel to a battery, and wherein said voltage regulating means comprises:
selecting means for selecting a high reference voltage when said electric load is switched on and begins drawing current;
comparator means coupled to said battery, said selecting means, and said analog control means for comparing the battery voltage to said high reference voltage and signalling said analog control means to alternately switch said field current on and off during said transient period while said battery voltage is less than said high reference voltage.

19. The system of claim 18 wherein said analog control means senses said battery voltage, and sets said present on and off times to values directly proportional to said battery voltage.

20. The system of claim 18 wherein said analog control means sets said present on time to a constant, senses said battery voltage, and sets said present off time to a value directly proportional to said battery voltage.

21. The system of claim 18 wherein said analog control means sets said present off time to a constant, senses said battery voltage, and sets said present on time to a value directly proportional to said battery voltage.

22. The system of claim 13 wherein said analog control means senses the frequency with which said analog control means is alternately switching said field current on and off during said transient period, sets said present on time to a constant, and sets said present off time to a value directly proportional to said frequency.

23. The system of claim 13 wherein said analog control means senses the elapsed time since the beginning of said transient period, sets said present on time to a value directly proportional to said elapsed time, and sets said present off time to a value inversely proportional to said present on time.

24. A control system for forcibly switching the field current to a field coil of an engine driven generator coupled in parallel to a battery on and off one or more times during a transient period when an electric load coupled to the generator is switched on and begins to draw current, comprising:
control means coupled to said field coil for alternating one or more times during said transient period between determining a present on time and switching said field current on for said present on time, then determining a present off time, and forcibly switching said field current off for said present off time; and
comparing means coupled to said control means and to said battery for selecting a high or a low reference voltage, for comparing said selected reference voltage with the battery voltage, and for signalling said control means to alternately switch said field current on and off during said transient period while said battery voltage is less then said selected voltage.

25. The system of claim 24 wherein said comparing means is coupled to an input signal determinative of engine operating and load conditions which is used by said comparing means to select either said high or low reference voltage.

26. The new system of claim 25 wherein said control means senses whether ssaid high or low reference voltage is selected by said comparing means, and sets said present on time to a low value when said high reference voltage is selected by said comparing means, sets said present on time to a high value when said low reference voltage is selected by said comparing means, and sets said present off time to a constant.

27. The system of claim 25 wherein said control means senses whether ssaid high or low reference voltage is selected by said comparing means, sets said present off time to a high value when said high reference voltage is selected by said comparing means, sets said present off time to a low value when said low reference voltage is selected by said comparing means, and sets said present on time to a constant.

28. The system of claim 25 wherein said control means sets said present off time to a constant, senses whether said comparing means is switching from selecting said low reference voltage to selecting said high reference voltage, and sets said present on time to a low value when said comparing means is so switching.

29. The system of claim 25 wherein said control means sets said present on time to a constant, senses whether said comparing means is switching from selecting said low reference voltage to selecting said high reference voltage, and sets said present off time to a high value when said comparing means is so switching.

30. A control system for an engine driven generator including a field coil wherein the generator is coupled to a battery, wherein the system has control means for providing on and off signals for switching the field current to the field coil of the generator on and off respectively in response to a comparator which compares the battery voltage with a reference voltage for developing an on time for switching said field current on, wherein the control means comprises:
a controller for detecting a present on time;
means for determining whether said present on time equals or exceeds a predetermined control period set by said controller; and
means for forcibly switching said control means to temporarily provide said off signal and switch said field current off for a predeterdined off time set by said controller when said on time equals or exceeds said predetermined control period.

31. The system of claim 30 wherein said controller sets said predetermined controll period and said predetermined off time to constants.

32. The system of claim 30 wherein said controller prolongs said control period as a function of said present on time.

33. The system of claim 30 wherein said controller shortens said off time as a function of said present on time.

34. The system of claim 30 wherein said controller varies said control period as a function of the variations in the voltage of the battery.

35. The system of claim 30 wherein said controller varies said off time as a function of variations in the voltage of the battery.

36. The system of claim 30 wherein said controller varies said control period and said off time with variations in the voltage of the battery.

37. The system of claim 30 wherein said control means switches said field current on and off for a number of on and off periods respectively, and wherein said controller varies said off time as a function of the number of said off periods.

38. The system of claim 30 wherein said controller varies said control period as a function of the reference voltage.

39. The system of claim 30 wherein said reference voltage is at a high or a low level, and wherein said controller shortens said control period when said reference voltage is set at said high level.

40. The system of claim 30 wherein said reference voltage is at a high or a low level, and wherein said controller shortens said control period when said reference voltage is switched from said low level to said high level.

41. The system of claim 30 wherein said controller terminates said forcible switching of said control means as a function of engine torque.

42. The system of claim 30 wherein said control means includes a field coil of the generator.

43. A control system for an engine driven AC generator connected in parallel to a battery, wherein a field winding of the generator is controlled in on and off states for on and off times respectively by a controller in response to an output signal of a comparator which compares the battery voltage with a reference voltage for developing an on time for switching said field winding into an on state so that said battery voltage is caused to change to said reference voltage, and wherein said field winding is forcibly switched into said on and off states a number of times, characterized in that the controller includes:

means for measuring and holding a present on time of the field winding;

means for detecting that the present on time is longer than a previous on time by a present prescribed time which is variably set by said controller a s function of a previous prescribed time and the number of forcible switches of the field widing to the off state; and means for forcibly switching the field winding of the generator to the of state temporarily for an off time if said present on time is longer than said previous on time by said prescribed time.

44. The control system of claim 43 wherein said controller sets said off time as a function of a previous on time and the number of forcible switches to the off state.

45. The control system of claim 43 including means for detecting that an output torque of the engine is in a high operating condition, and means for terminating the forcible switching of said field winding of said generator upon detection of said output torque of said engine.

46. A control system for an engine driven AC generator connected in parallel with the battery, wherein the generator includes a field coil and the field coil current for the generator is turned on and off by a controller in response to an output signal of a comparator which compares the battery voltage with a predetermined reference voltage in order that the battery voltage is caused to be brought to the level of the reference voltage, said control system for the generator comprising:

means for detecting that the field coil current for the generator has been turned on and continued for a predetermined first period of time set by said controller; and means for forcibly switching the field coil current off for a predetermined second period of time set by said controller when the above detection is made.

47. The control system of claim 46 wherein said controller sets said first period and said second period to constants.

48. The control system of claim 46 wherein said controller prolongs said first period while said output signal from said comparator signals said controller to switch said field coil current on.

49. The control system of claim 46 wherein said controller shortens said second period while said output signal from said comparator signals said controller to switch said field coil current on.

50. The control system of claim 46 wherein said controller varies said first period and said second period with variations in the voltage of the battery.

51. The control system of claim 46 wherein said field coil current is switched on and off for a number of on and off times respectively, and wherein said controller varies said second period in accordance with the number of times said field coil current is switched off.

52. The control system of claim 46 wherein said varying means shortens said first period when said reference voltage is set at said high voltage level.

53. A control system for an engine driven AC generator connected in parallel with a battery, wherein the generator includes a field coil and the field coil current for the generator is controlled by a controller to be switched on and off in response to an output signal of a comparator for comparing the battery voltage with a predetermined reference voltage in order that the battery voltage is caused to be brought to the level of the reference voltage said control system for the engine driven generator comprising:

means for switching said reference voltage of said comparator between a high voltage level and a low voltage level so that said reference voltage is set at said high voltage level or said low voltage level according to electrical load conditions and engine operating conditions;

means for detecting that the field coil current for the generator has continued on for a predetermined first period of time;

means for detecting that the field coil current for the generator has continued on for a predetermined first period of time;

means for forcibly switching the field coil current off for a predetermined second period of time set by said controller when the above detection is made; and means for varying said first period according to said high or low voltage level of said reference voltage.

54. The control system of claim 53 wherein said varying means shortens said first period when said reference voltage is switched from said low voltage level to said high voltage lvel.

55. An AC generator system including a field coil, and a voltage regulator including a comparator for comparing a battery voltage with a reference voltage and outputting a pulse signal to the field coil, comprising:

timer means for detecting a present on time of the pulse signal;

first means for detecting whether the present on time equals or exceeds a predetermined period; and second means for forcibly switching said field coil off by temporarily providing an off signal to the field coil for a predetermined off period regardless of the output of the comparator, in response to the first means.

* * * * *